(12) United States Patent
Yamamoto

(10) Patent No.: US 11,833,595 B2
(45) Date of Patent: Dec. 5, 2023

(54) CUTTING INSERT, CUTTING TOOL, AND METHOD FOR MANUFACTURING MACHINED PRODUCT

(71) Applicant: KYOCERA Corporation, Kyoto (JP)

(72) Inventor: Masahiro Yamamoto, Ritto (JP)

(73) Assignee: KYOCERA Corporation, Kyoto (JP)

( * ) Notice: Subject to any disclaimer, the term of this patent is extended or adjusted under 35 U.S.C. 154(b) by 592 days.

(21) Appl. No.: 16/969,413

(22) PCT Filed: Feb. 25, 2019

(86) PCT No.: PCT/JP2019/007004
§ 371 (c)(1),
(2) Date: Aug. 12, 2020

(87) PCT Pub. No.: WO2019/167866
PCT Pub. Date: Sep. 6, 2019

(65) Prior Publication Data
US 2020/0398354 A1    Dec. 24, 2020

(30) Foreign Application Priority Data

Mar. 1, 2018 (JP) ................................ 2018-036365

(51) Int. Cl.
*B23C 5/20* (2006.01)
*B23C 3/13* (2006.01)

(52) U.S. Cl.
CPC ............... *B23C 5/202* (2013.01); *B23C 3/13* (2013.01)

(58) Field of Classification Search
CPC ......... B23B 27/20; B23B 27/14; B23B 27/16; B23B 27/18; B23B 27/22; B23B 27/145; B23B 27/141; B23B 2300/3681; B23C 2200/081
See application file for complete search history.

(56) References Cited

U.S. PATENT DOCUMENTS 4,159,884 A * 7/1979 Schott .................. B23B 27/143
407/113
4,159,885 A * 7/1979 Schott .................. B23B 27/148
407/116

(Continued)

FOREIGN PATENT DOCUMENTS

JP          07266106 A  * 10/1995
JP          08118113 A  *  5/1996
(Continued)

*Primary Examiner* — Nicole N Ramos
(74) *Attorney, Agent, or Firm* — Volpe Koenig

(57) ABSTRACT

A cutting insert may include a base body, a first part and a second part. The base body may include a first surface, a second surface, a first lateral surface, a second lateral surface, a first recess and a second recess. The first part may be located in the first recess. The second part may be located in the second recess. The first recess may include a first bottom surface, a first wall surface and a first valley line located on an intersection of the first bottom surface and the first wall surface. The second recess may include a second bottom surface, a second wall surface and a second valley line located on an intersection of the second bottom surface and the second wall surface. The first valley line may intersect with the second valley line in a perspective view of the first surface.

9 Claims, 23 Drawing Sheets

(56) References Cited

U.S. PATENT DOCUMENTS

| | | | | |
|---|---|---|---|---|
| 4,437,800 A | * | 3/1984 | Araki | B23B 27/18 144/241 |
| 4,651,810 A | * | 3/1987 | Triessnig | F27B 3/26 165/9.2 |
| 5,215,415 A | * | 6/1993 | Fukuoka | B23B 27/143 407/119 |
| 5,712,030 A | * | 1/1998 | Goto | B23B 27/145 428/408 |
| 6,155,755 A | * | 12/2000 | Kanada | B23B 27/18 407/119 |
| 6,540,450 B2 | * | 4/2003 | Gatton | B23B 5/02 82/111 |
| 7,118,312 B2 | * | 10/2006 | Norstrom | B23B 27/145 407/113 |
| 7,765,902 B2 | * | 8/2010 | Kuroda | B23D 35/002 407/119 |
| 8,087,852 B2 | * | 1/2012 | Muraki | B23B 27/20 407/66 |
| D664,168 S | * | 7/2012 | Okamura | D15/139 |
| 10,245,644 B2 | * | 4/2019 | Kukino | B24B 3/34 |
| 10,245,645 B1 | * | 4/2019 | Wang | B23B 27/18 |
| 2002/0131832 A1 | * | 9/2002 | Morsch | B23B 27/045 407/119 |
| 2004/0237723 A1 | * | 12/2004 | Kanada | C04B 41/5068 407/113 |
| 2005/0123365 A1 | * | 6/2005 | Goudemond | B23P 15/28 407/113 |
| 2005/0254908 A1 | * | 11/2005 | Norstrom | B23B 27/145 407/113 |
| 2007/0116531 A1 | * | 5/2007 | Okita | B23B 27/143 407/119 |
| 2007/0207715 A1 | * | 9/2007 | Webb | B23P 15/28 451/540 |
| 2008/0025802 A1 | * | 1/2008 | Kukino | B23B 27/145 419/13 |
| 2011/0036226 A1 | * | 2/2011 | Cohen | B23B 27/1662 29/428 |
| 2015/0266112 A1 | * | 9/2015 | Morrison | B23C 5/2273 407/108 |
| 2015/0343536 A1 | * | 12/2015 | Ai | B23B 27/145 407/66 |
| 2017/0106455 A1 | * | 4/2017 | Koike | B23C 5/202 |

FOREIGN PATENT DOCUMENTS

| | | | |
|---|---|---|---|
| JP | 2001009606 A | * | 1/2001 |
| JP | 2004345028 A | * | 12/2004 |
| JP | 2006-187813 A | | 7/2006 |

* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2019/007004, filed on Feb. 25, 2019, which claims priority to Japanese Application No. 2018-036365, filed on Mar. 1, 2018, which is entirely incorporated herein by reference.

TECHNICAL FIELD

The present disclosure generally relates to cutting insert for use in a cutting process. Specifically, the present disclosure relates to cutting insert including a part composed of a hard material, such as cubic boron nitride (cBN) and polycrystalline diamond (PCD).

BACKGROUND

For example, a cutting insert is discussed in Japanese Unexamined Patent Application Publication No. 2006-187813 (Patent Document 1) as a cutting tool for use in a cutting process of a workpiece, such as metal. Patent Document 1 discusses the cutting insert that includes a main body including recesses respectively disposed on both front and rear surfaces thereof, and a plurality of composite bodies respectively soldered to the recesses of the main body. The cutting insert discussed in Patent Document 1 may have excellent economic efficiency because it includes the plurality of composite bodies.

SUMMARY

A cutting insert in a non-limiting embodiment may include a base body, a first part and a second part. The base body may include a first surface, a second surface, a first lateral surface, a second lateral surface, a first recess and a second recess. The second surface may be located on a side opposite to the first surface. The first lateral surface may connect to the first surface and the second surface. The second lateral surface may connect to the first surface, the second surface and the first lateral surface. The first recess may open into the first surface, the first lateral surface and the second lateral surface. The second recess may open into the second surface, the first lateral surface and the second lateral surface. The first part may be located in the first recess and may include a first cutting edge located at an intersection of two adjacent surfaces. The second part may be located in the second recess and may include a second cutting edge located at an intersection of two adjacent surfaces.

The first recess may include a first bottom surface located away from the first surface, a first wall surface located between the first bottom surface and the first surface, and a first valley line located on an intersection of the first bottom surface and the first wall surface. The second recess may include a second bottom surface located away from the second surface, a second wall surface located between the second bottom surface and the second surface, and a second valley line located on an intersection of the second bottom surface and the second wall surface. The first valley line may intersect with the second valley line in a perspective view of the first surface.

DETAILED DESCRIPTION

Figure 1:
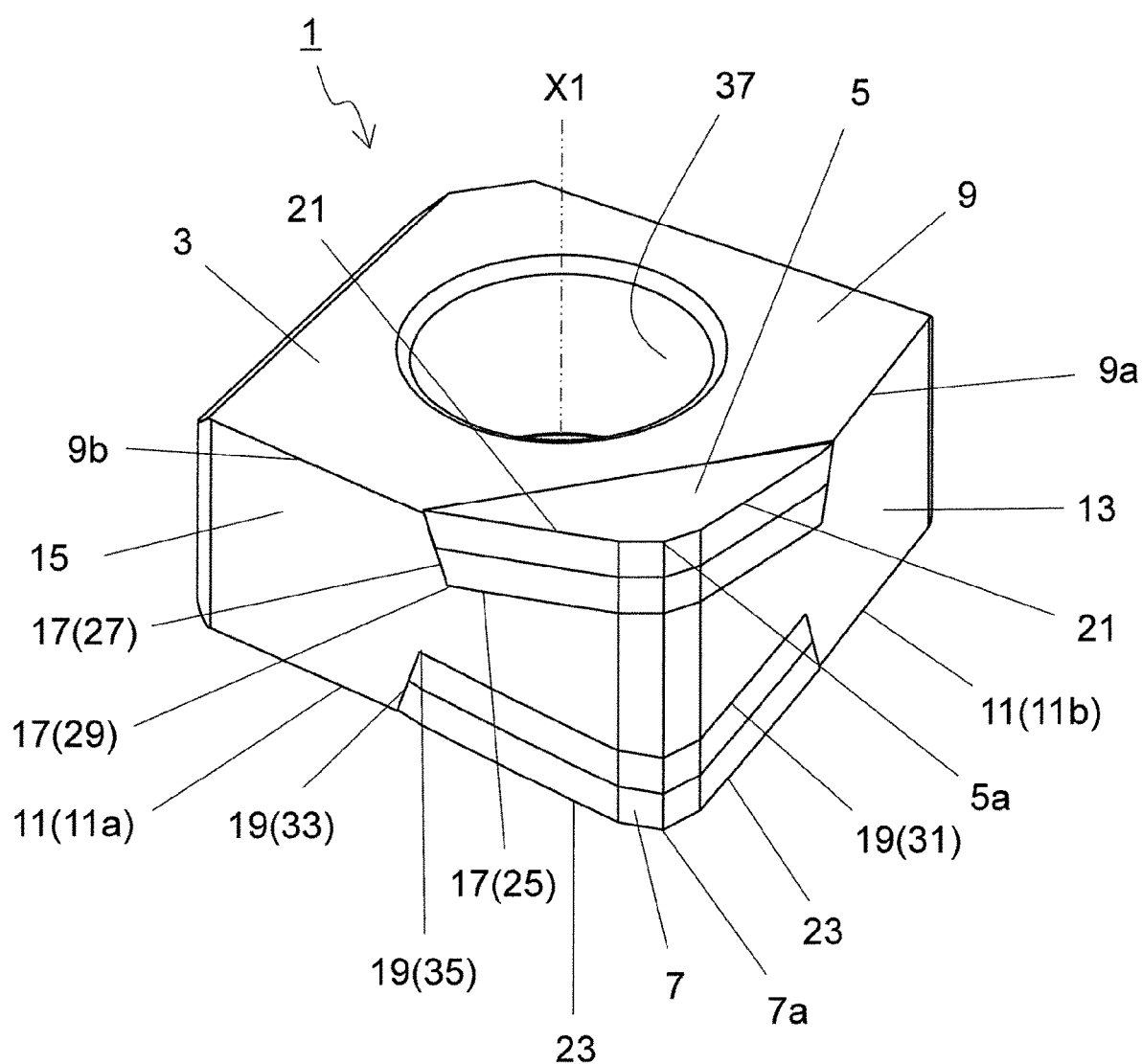
FIG. 1 is a perspective view illustrating a cutting insert in a non-limiting embodiment.

In cases where the recesses are respectively formed on both front and rear surfaces of the main body as in the cutting insert discussed in Patent Document 1, a region surrounded by these recesses in the main body may become thin. Specifically, a valley line part in the recess located on a front side and a valley line part in the recess located on a rear side may be located so as be overlapped with each other in a perspective view in the cutting insert discussed in Patent Document 1.

A large load may tend to be applied to the valley line parts located at a boundary between a seating surface and a wall surface in the recess during a cutting process of a workpiece. Cracking may occur between the two valley line parts because the two valley line parts are located so as to be overlapped with each other in the perspective view as described above in the cutting insert discussed in Patent Document 1.

Cutting inserts 1 (hereinafter also referred to simply as "inserts 1") in non-limiting embodiments may be described in detail below with reference to the drawings. For the sake of description, the drawings referred to in the following may illustrate, in simplified form, only main components necessary for describing the non-limiting embodiments. The inserts 1 may therefore be capable of including any arbitrary component not illustrated in the drawings referred to. Dimensions of the components in each of the drawings faithfully may represent neither dimensions of actual components nor dimensional ratios of these components.

<Cutting Inserts>

The insert 1 in the non-limiting embodiments may include a base body 3, a first part 5 and a second part 7. The base body 3 may include a first surface 9, a second surface 11, a first lateral surface 13, a second lateral surface 15, a first recess 17 and a second recess 19. The base body 3 may have an approximately polygonal plate shape. For example, the base body 3 may have a quadrangular plate shape in the non-limiting embodiments illustrated in FIG. 1.

Figure 2:
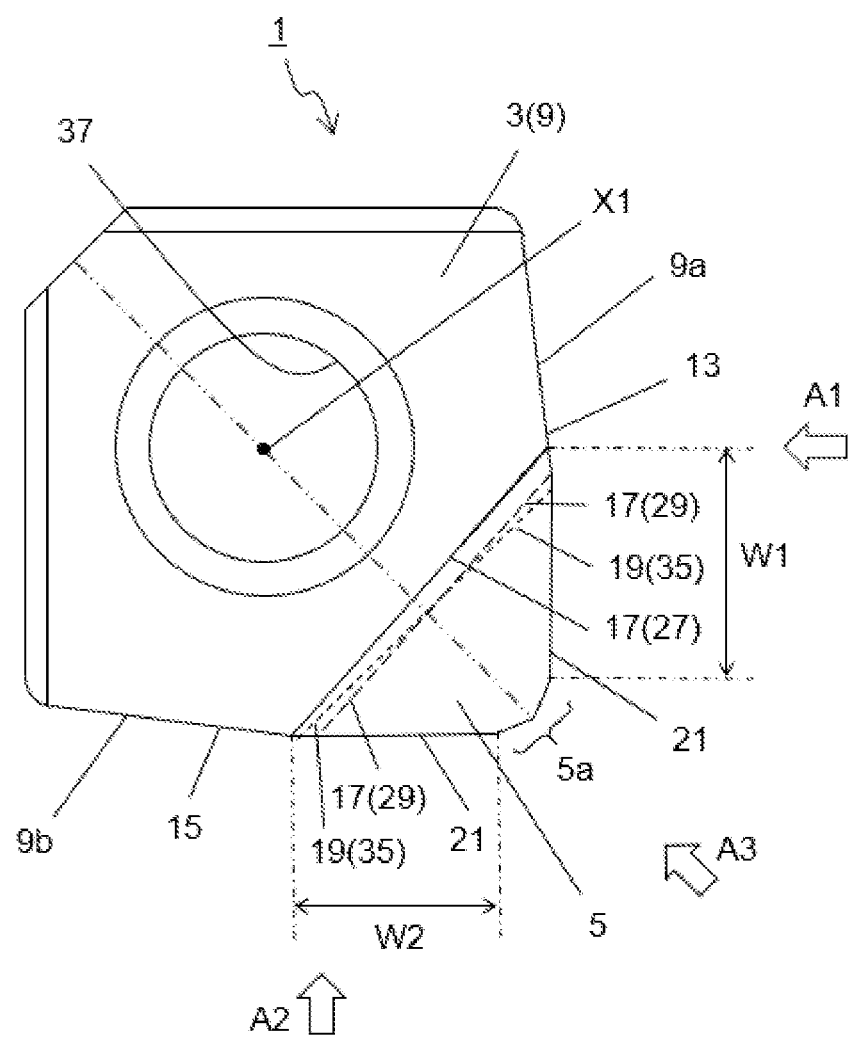
FIG. 2 is a front view of a first surface of the cutting insert illustrated in FIG. 1.

The first surface 9 may have a polygonal shape as illustrated in FIG. 1. The first surface 9 may have a quadrangular shape as viewed from the front as illustrated in FIG. 2. In this case, at least one of four corners of the first surface 9 may have a cutout shape.

One of two sides extended toward the corner thus cut out may be called a first side 9a and the other may be called a second side 9b. That is, the corner of the first surface 9 which is located between the first side 9a and the second side 9b may have a cutout configuration as illustrated in FIG. 2. The first recess 17 may be located in a region including the cutout corner.

The second surface 11 may be a surface located on a side opposite to the first surface 9 and may have a polygonal shape. The second surface 11 may have a quadrangular shape. Similarly to the first surface 9, at least one of four corners of the second surface 11 may have a cutout shape.

One of two sides extended toward the cutout corner may be called a third side 11a and the other may be called a fourth side 11b. That is, the corner of the second surface 11 which is located between the third side 11a and the fourth side 11b may have a cutout configuration. The second recess 19 may be located in a region including the cutout corner.

As used here, the polygonal shape is not limited to a strict polygonal shape. For example, at least one of the four corners of the first surface 9, except for the cutout corner, may have such a shape that is rounded and slightly protruded outward in a front view of the first surface 9.

Shapes of the four sides are not limited to strict straight line shapes in a front view of the first surface 9. For example, the four sides may have a slightly outwardly-protruded shape or a slightly recessed shape in the front view of the first surface 9.

The second surface 11 may be parallel or inclined relative to the first surface 9. The second surface 11 may be parallel to the first surface 9 in a non-limiting embodiment illustrated in FIGS. 3 to 5. The first lateral surface 13 and the second lateral surface 15 may be located as a lateral surface between the first surface 9 and the second surface 11. The first lateral surface 13 and the second lateral surface 15 may respectively connect to the first surface 9 and the second surface 11.

Figure 5:
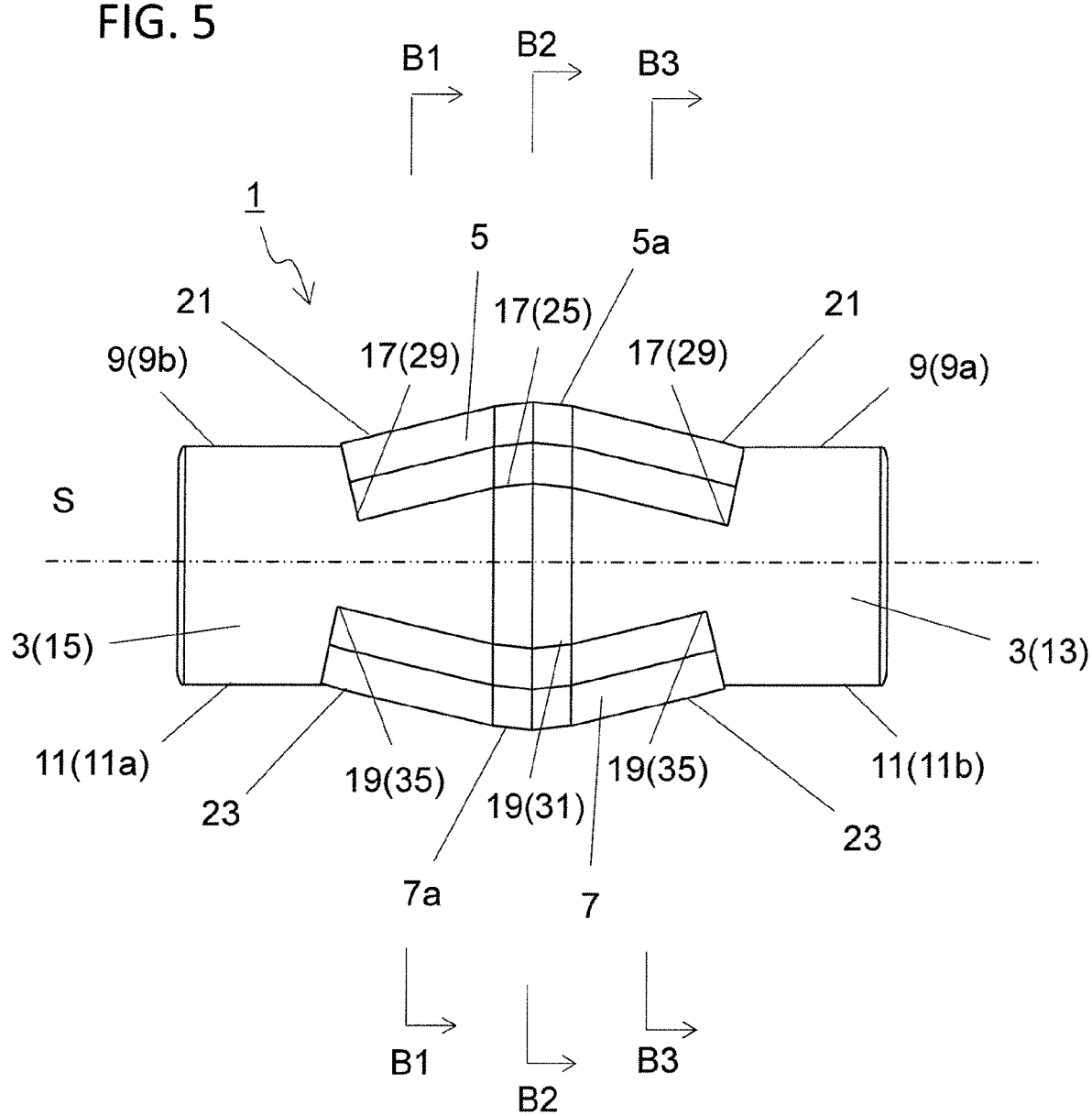
FIG. 5 is a side view of the cutting insert illustrated in FIG. 2 as viewed from an A3 direction.

The first lateral surface 13 and the second lateral surface 15 may be located adjacent to each other and may connect to each other. The first lateral surface 13 may connect to the first side 9a of the first surface 9 and the fourth side 11b of the second surface 11 as illustrated in FIG. 5. The second lateral surface 15 may connect to the second side 9b of the first surface 9 and the third side 11a of the second surface 11 as illustrated in FIG. 5.

The first recess 17 may be located over the first surface 9, the first lateral surface 13 and the second lateral surface 15 as illustrated in FIG. 5. The first recess 17 may open into each of the first surface 9, the first lateral surface 13 and the second lateral surface 15. The second recess 19 may be located over the second surface 11, the first lateral surface 13 and the second lateral surface 15. The second recess 19 may open into each of the second surface 11, the first lateral surface 13 and the second lateral surface 15. The first recess 17 and the second recess 19 may be located so as to be overlapped with each other in the perspective view in the present disclosure.

The first part 5 may be located in the first recess 17. The first part 5 may have a triangular plate shape as illustrated in FIG. 1. The first part 5 may have a triangular shape in a plan view of the first surface 9 of the base body 3 in a non-limiting embodiment illustrated in FIG. 2.

The first part 5 may include a first cutting edge 21 located on an intersection of two adjacent surfaces. Specifically, the first cutting edge 21 may be located throughout the intersection of the two adjacent surfaces, or alternatively located only a part of the intersection.

If one of corners of the first part 5 having a triangular shape in a plan view thereof is called a first corner 5a, the first corner 5a may be located so as to correspond to the cutout corner of the first surface 9 in the base body 3. One of two sides extended from the first corner 5a may be located along the first side 9a of the first surface 9 in the base body 3.

The other of the two sides extended from the first corner 5a may be located along the second side 9b of the first surface 9 in the base body 3. The first cutting edge 21 may be located over the first corner 5a and two sides extended from the first corner 5a in a non-limiting embodiment illustrated in FIG. 1.

The second part 7 may be located at the second recess 19. Similarly to the first part 5, the second part 7 may have a triangular shape as illustrated in FIG. 1. The second part 7 may have a triangular shape in a plan view of the second surface 11 of the base body 3.

The second part 7 may include a second cutting edge 23 located on an intersection of two adjacent surfaces. Specifically, the second cutting edge 23 may be located throughout the intersection of the two adjacent surfaces, or alternatively located only a part of the intersection.

If one of corners of the second part 7 having the triangular shape in a plan view thereof is called a second corner 7a, the second corner 7a may be located so as to correspond to the cutout corner of the second surface 11 in the base body 3. One of two sides extended from the second corner 7a may be located along the third side 11a of the second surface 11 in the base body 3.

The other of the two sides extended from the second corner 7a may be located along the fourth side 11b of the second surface 11 in the base body 3. The second cutting edge 23 may be located over the second corner 7a and two sides extended from the second corner 7a in a non-limiting embodiment illustrated in FIG. 1.

The first corner 5a of the first part 5 may be located so as to be overlapped or not overlapped with the second corner 7a of the second part 7 in a perspective view of the first surface 9. The first corner 5a of the first part 5 may be located so as to be overlapped with the second corner 7a of the second part 7 in a non-limiting embodiment illustrated in FIG. 2.

The first recess 17 of the base body 3 may include a first bottom surface 25, a first wall surface 27 and a first valley line 29. The first bottom surface 25 may be located away from the first surface 9. The first wall surface 27 may be located between the first bottom surface 25 and the first surface 9. The first valley line 29 may be located on an intersection of the first bottom surface 25 and the first wall surface 27.

Figure 3:
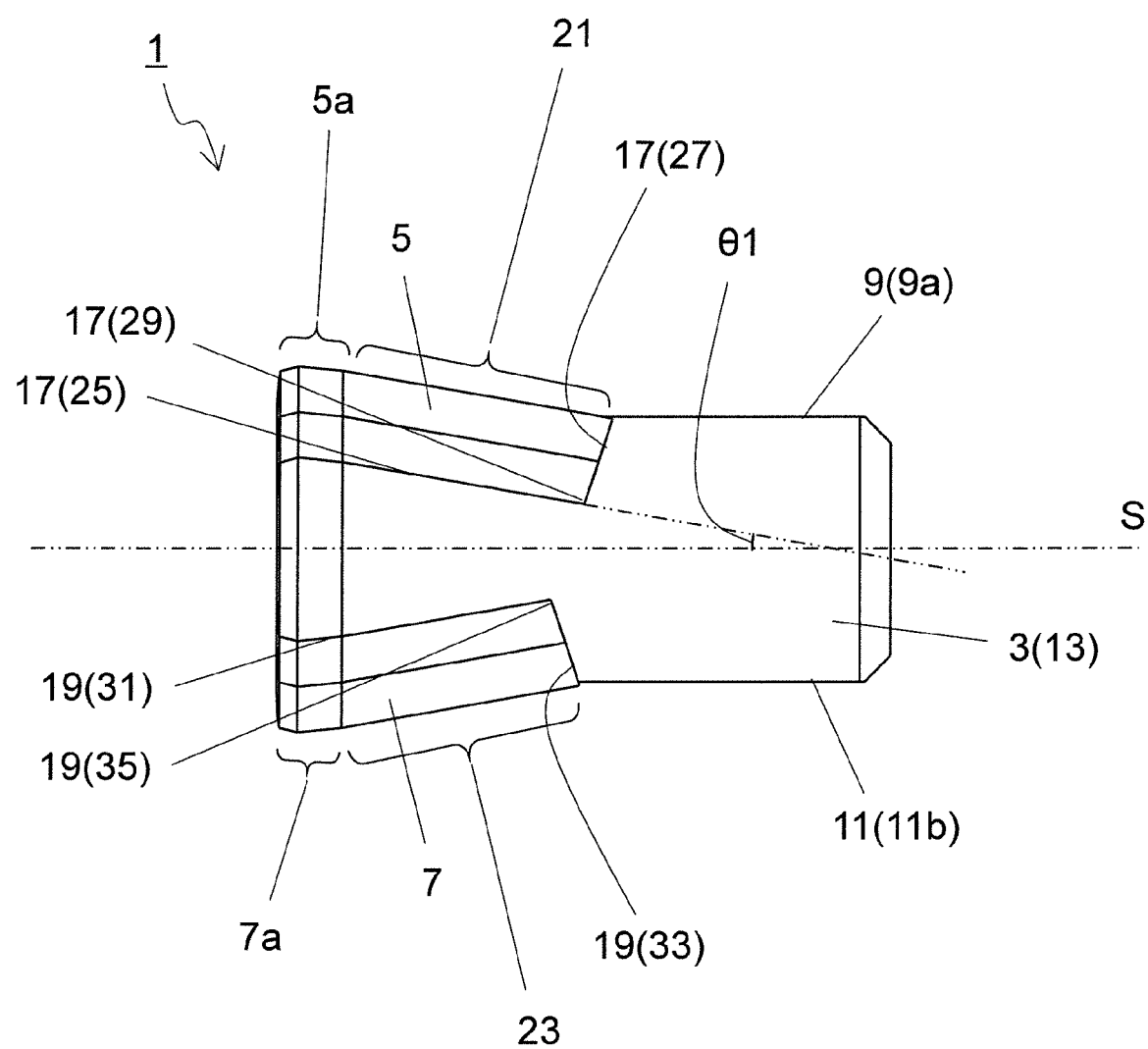
FIG. 3 is a side view of the cutting insert illustrated in FIG. 2 as viewed from an A1 direction.
Figure 4:
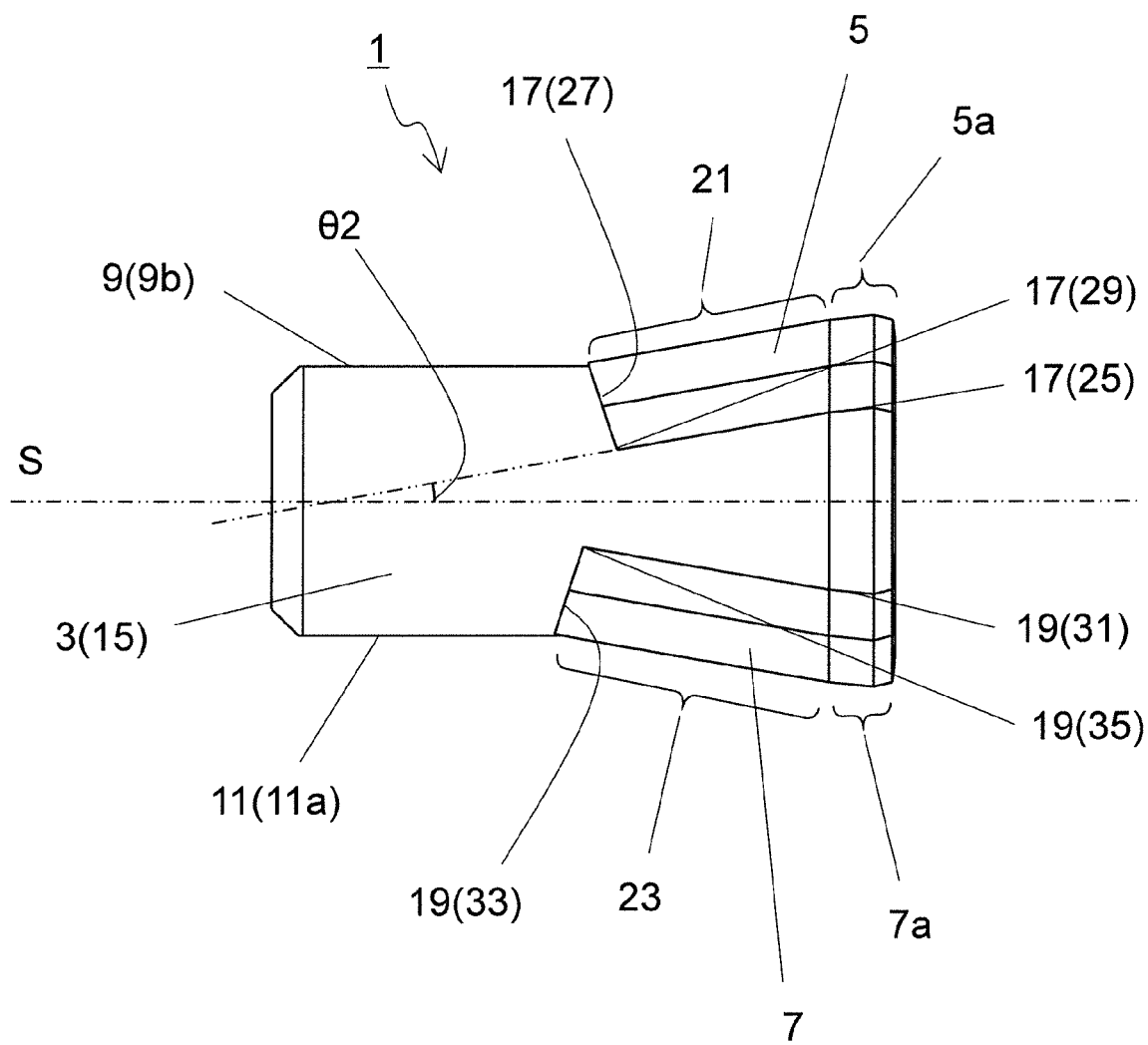
FIG. 4 is a side view of the cutting insert illustrated in FIG. 2 as viewed from an A2 direction.

A shape of the first bottom surface 25 is not particularly limited but may have a flat surface shape as illustrated in FIGS. 3 to 5. The first bottom surface 25 may connect to the first lateral surface 13 and the second lateral surface 15 as illustrated in FIGS. 3 to 5. A shape of the first wall surface 27 is not particularly limited. Similarly to the first bottom surface 25, the first wall surface 27 may have a flat surface shape as illustrated in FIGS. 3 to 5.

The first valley line 29 may therefore have a straight line shape in a non-limiting embodiment illustrated in FIG. 5. Although the first valley line 29 may have a curvilinear shape, a cutting load may be less likely to be concentrated at a specific portion if having the straight line shape. This may lead to enhanced durability of the base body 3.

The second recess 19 of the base body 3 may include a second bottom surface 31, a second wall surface 33 and a second valley line 35. The second bottom surface 31 may be located away from the second surface 11. The second wall surface 33 may be located between the second bottom surface 31 and the second surface 11. The second valley line 35 may be located on an intersection of the second bottom surface 31 and the second wall surface 33.

A shape of the second bottom surface 31 is not particularly limited but may have a flat surface shape as illustrated in FIGS. 3 to 5. The second bottom surface 31 may connect to the first lateral surface 13 and the second lateral surface 15 as illustrated in FIGS. 3 to 5. A shape of the second wall surface 33 may also be not particularly limited. Similarly to the second bottom surface 31, the second wall surface 33 may have a flat surface shape as illustrated in FIGS. 3 to 5.

The second valley line 35 may therefore have a straight line shape in a non-limiting embodiment illustrated in FIG. 5. Although the second valley line 35 may have a curvilinear shape, a cutting load may be less likely to be concentrated at a specific portion if having the straight line shape. This may lead to the enhanced durability of the base body 3.

The first valley line 29 may not be overlapped with the second valley line 35, and the first valley line 29 may intersect with the second valley line 35 in a perspective view of the insert 1 from a side of the first surface 9 as illustrated in FIG. 2. To facilitate visual understanding, the first valley line 29 may be indicated by a large-pitch chain line, and the second valley line 35 may be indicated by a small-pitch chain line in FIG. 2.

A portion having a larger thickness than a thickness between the first bottom surface 25 and the second bottom surface 31 may be located between the first valley line 29 and the second surface 11. Therefore, even if the first cutting edge 21 is used for a cutting process, cracking may therefore be less likely to occur between the first valley line 29 and the second valley line 35, thus leading to the enhanced durability of the base body 3.

A portion having a larger thickness than a thickness between the first bottom surface 25 and the second bottom surface 31 may also be located between the second valley line 35 and the first surface 9. Therefore, even if the second cutting edge 23 is used for a cutting process, cracking may therefore be less likely to occur between the first valley line 29 and the second valley line 35, thus leading to the enhanced durability of the base body 3.

The first valley line 29 and the second valley line 35 may not be orthogonal to a bisector L1 of the first corner 5a but may be inclined relative to the bisector L1 of the first corner 5a.

The first part 5 may be located in the first recess 17 and the second part 7 may be located in the second recess 19 in the insert 1 of the present disclosure. Accordingly, the first valley line 29 and the second valley line 35 cannot be observed if the first surface 9 is viewed from the front. However, positions of the first valley line 29 and the second valley line 35 may be evaluable by, for example, the following method.

Specifically, in cases where the first part 5 and the second part 7 are joined to the base body 3 by using a joining member as described later, the first part 5 and the second part 7 may be separated from the base body 3 by melting the joining member. Consequently, the first valley line 29 may become visible in a front view of the first surface 9, and the second valley line 35 may become visible in a front view of the second surface 11. It may therefore be possible to evaluate whether the first valley line 29 intersects with the second valley line 35 in a perspective view from a side of the first surface 9.

If it is difficult to separate the first part 5 and the second part 7 from the base body 3 as in cases where the base body 3, the first part 5 and the second part 7 are formed integrally, the positions of the first valley line 29 and the second valley line 35 may be evaluated by, for example, the following method.

Figure 6:
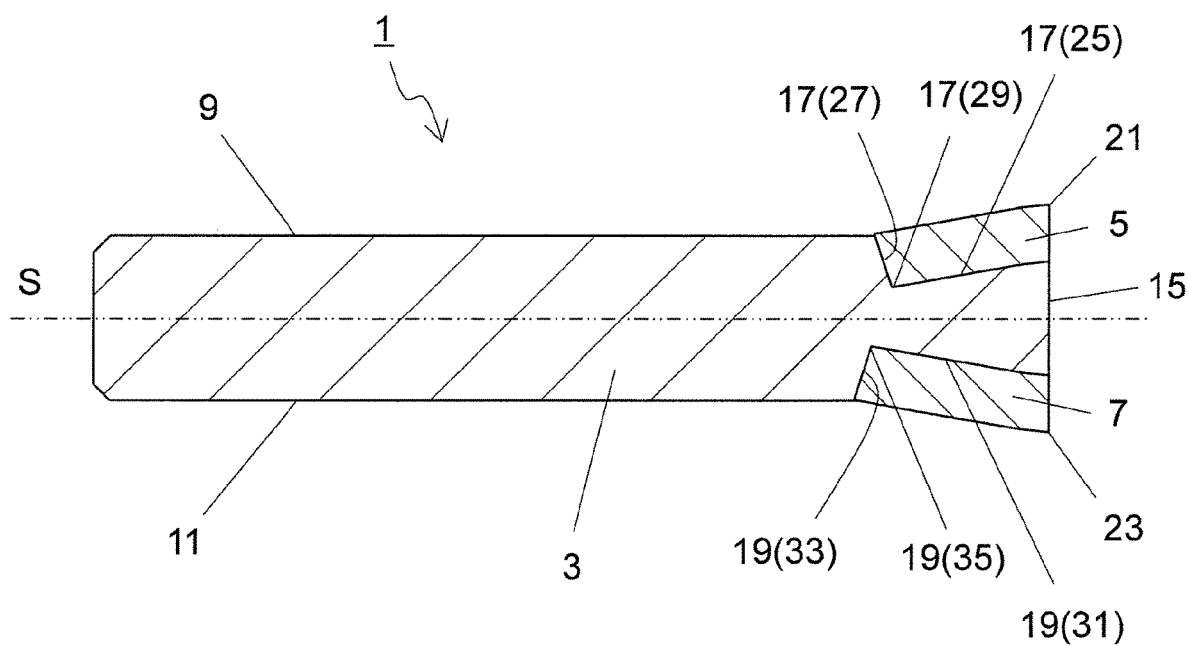
FIG. 6 is a cross-sectional view taken along the line B1-B1 in the cutting insert illustrated in FIG. 5.
Figure 7:
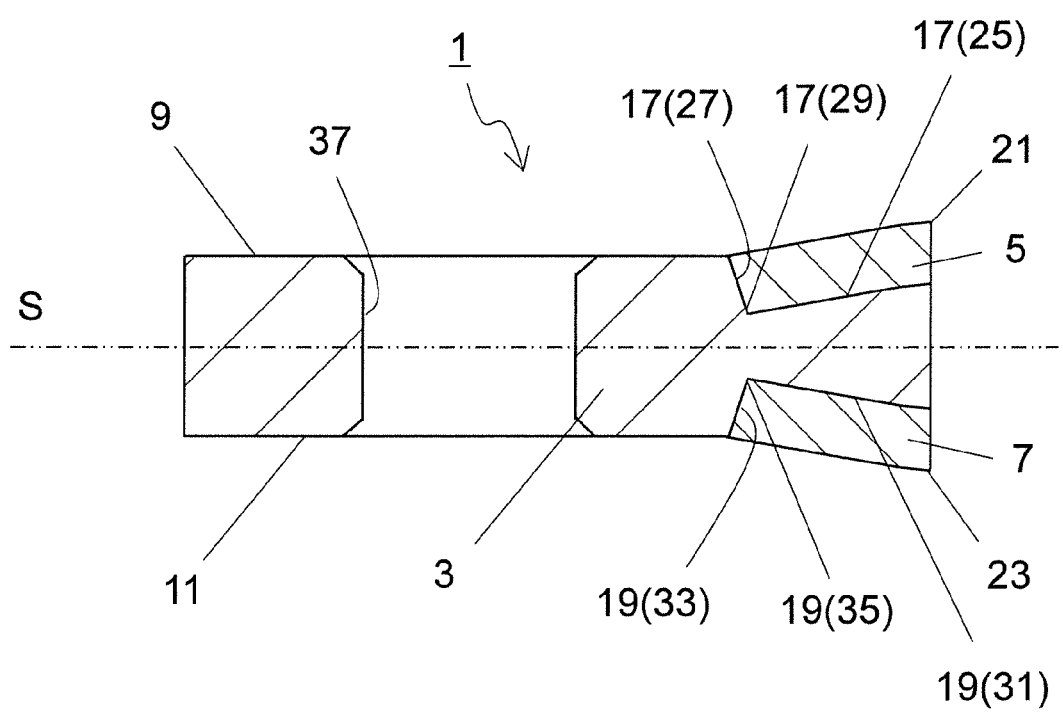
FIG. 7 is a cross-sectional view taken along the line B2-B2 in the cutting insert illustrated in FIG. 5.
Figure 8:
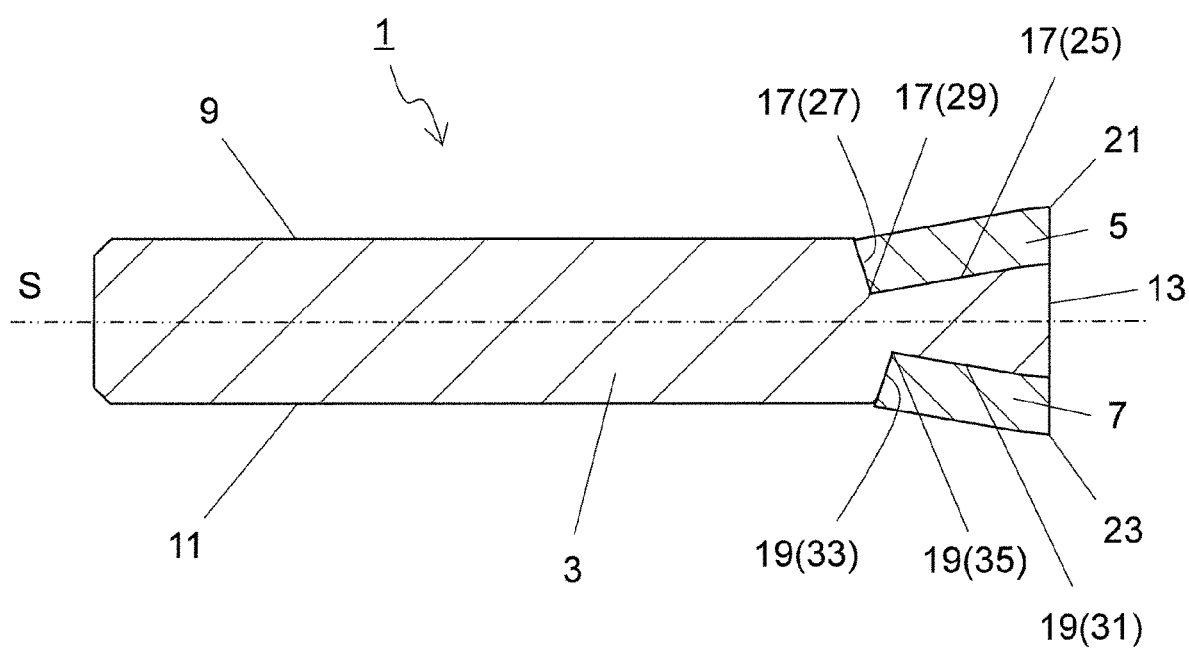
FIG. 8 is a cross-sectional view taken along the line B3-B3 in the cutting insert illustrated in FIG. 5.
Figure 9:
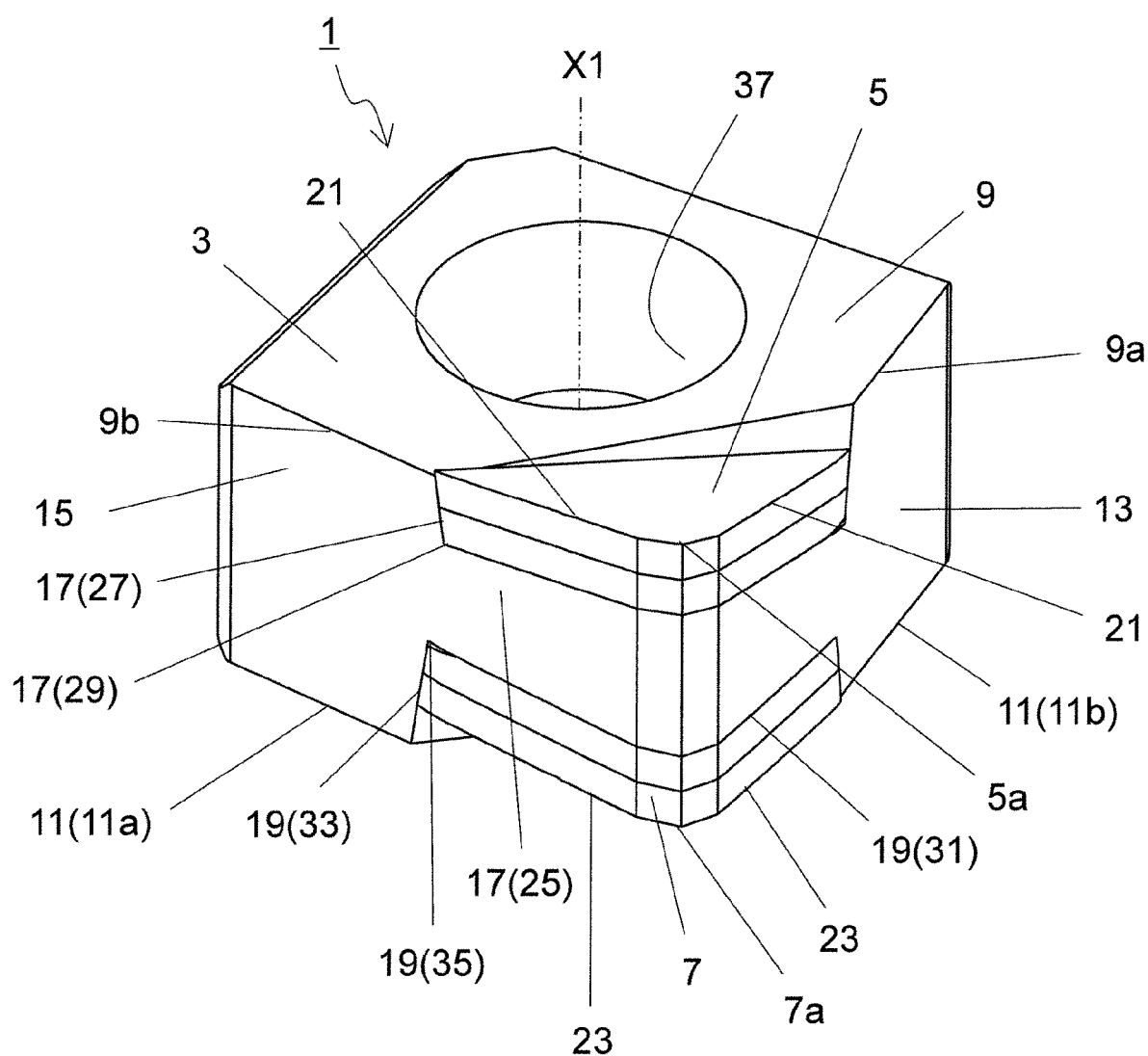
FIG. 9 is a perspective view illustrating a cutting insert in the non-limiting embodiment.
Figure 10:
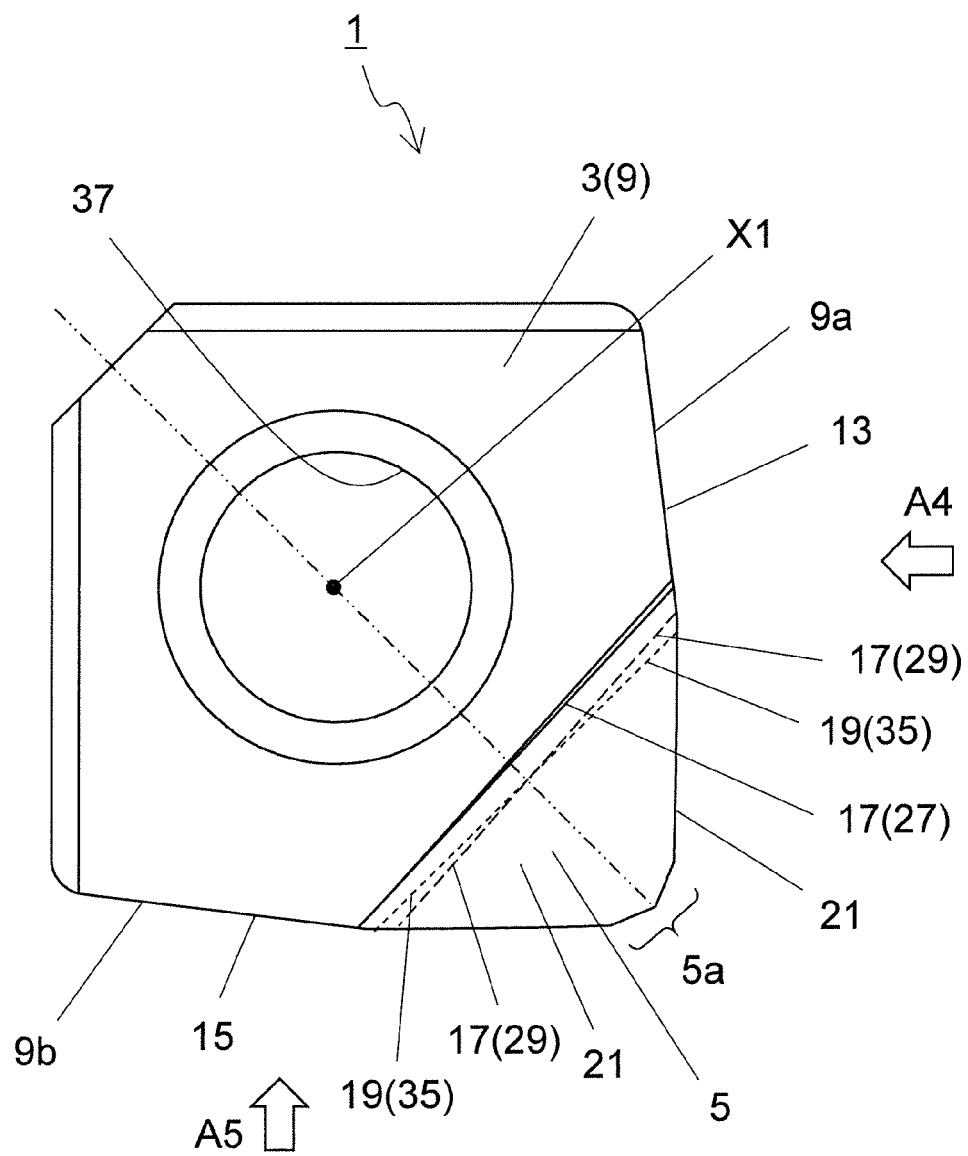
FIG. 10 is a front view of a first surface of the cutting insert illustrated in FIG. 9.

Specifically, for example, the first valley line 29 and the second valley line 35 may be specified in a plurality of cross sections parallel to the bisector L1 of the first corner 5a and a central axis X1 as illustrated in FIGS. 6 to 8. The positions of the first valley line 29 and the second valley line 35 may be estimated by connecting the first valley line 29 and the second valley line 35 in these cross sections. An evaluation as to whether the first valley line 29 intersects with the second valley line 35 may be made on the basis of an estimation result.

The number of cross sections for specifying the positions of the first valley line 29 and the second valley line 35 may be at least three, however, there is no problem even if the number is four or more.

Dimensions of the base body 3 are not particularly limited. For example, a length of one side of the first surface 9 having the polygonal shape may be set to approximately 3-20 mm. A height from the first surface 9 to the second surface 11, namely, a height in a direction along the central axis X1 passing through a center of the first surface 9 and a center of the second surface 11 may be set to approximately 5-20 mm.

A width in a direction along the first lateral surface 13 in the first recess 17 may be set to approximately 1-10 mm in the front view of the first surface 9. A height of the first recess 17 in the direction along the central axis X1 may be set to approximately 1.5-4 mm. Similarly, a width in a direction along the second lateral surface 15 in the second recess 19 may be set to approximately 1-10 mm in a front view of the second surface 11. A height of the second recess 19 in the direction along the central axis X1 may be set to approximately 1.5-4 mm.

The first part 5 may have a polygonal shape in the front view of the first surface 9 such as in cases where the first part 5 has the triangular shape in a non-limiting embodiment illustrated in FIG. 2. Specifically, a surface of the first part 5 which is along the first surface 9 may include a side along the first side 9a and a side along the second side 9b. Lengths of these sides may be the same as or different from each other.

For example, a length of the side along the first side 9a in the first part 5 may be larger than a length of the side along the second side 9b in the first part 5 in the front view of the first surface 9 as illustrated in FIG. 2. In other words, a width W1 in a direction along the first lateral surface 13 in the first part 5 may be larger than a width W2 in a direction along the second lateral surface 15 in the first part 5 in the front view of the first surface 9.

If the first part 5 has the above configuration, the first valley line 29 may be inclined relative to the bisector L1 of the first corner 5a, and the first valley line 29 may tend to intersect with the second valley line 35 in the perspective view of the first surface 9. This may make it easier to enhance the durability of the insert 1.

The second part 7 may have a polygonal shape in the front view of the second surface 11. Specifically, a surface of the second part 7 which is along the second surface 11 may include a side along the third side 11a and a side along the fourth side 11b. Lengths of these sides may be the same as or different from each other.

For example, as illustrated in FIG. 2, a length of a side of the second part 7 which is along the third side 11a may be larger than a length of a side of the second part 7 which is along the fourth side 11b in the front view of the second surface 11. In other words, a width W3 in a direction along the second lateral surface 15 in the second part 7 may be larger than a width W4 in a direction along the first lateral surface 13 in the second part 7 in the front view of the second surface 11.

If the second part 7 has the above configuration, the second valley line 35 may be inclined relative to the bisector L1 of the first corner 5a, and the first valley line 29 may tend to intersect with the second valley line 35 in the perspective view of the first surface 9. This may make it easier to enhance the durability of the insert 1.

The insert 1 may have higher durability if the first valley line 29 and the second valley line 35 are located away from end portions thereof than if the first valley line 29 and the second valley line 35 are overlapped with each other at the end portions thereof in the perspective view of the first surface 9. Hence, the insert 1 may have the enhanced durability if the first valley line 29 is located more away from the second lateral surface 15 than the second valley line 35 in the front view of the first lateral surface 13 as in a non-limiting embodiment illustrated in FIG. 3.

For the same reason, the insert 1 may have the enhanced durability if the first valley line 29 is located more away from the first lateral surface 13 than the second valley line 35 in the front view of the second lateral surface 15 as in a non-limiting embodiment illustrated in FIG. 4.

The insert 1 may have further enhanced durability particularly if the first valley line 29 intersects with the second valley line 35 on the bisector L1 of the first corner 5a in the perspective view of the first surface 9. This may be because of a decrease in deviation of durability of the insert 1 between the case of using the first cutting edge 21 and the case of using the second cutting edge 23.

The above configuration may be reworded that a length from the first lateral surface 13 to an intersection where the first valley line 29 intersects with the second valley line 35 is equal to a length from the second lateral surface 15 to the intersection in the perspective view of the first surface 9.

The base body 3 may further include an imaginary plane S that is located between the first recess 17 and the second recess 19 and is orthogonal to the central axis X1 in a non-limiting embodiment illustrated in FIGS. 3 to 5. The imaginary plane S may be parallel to the first surface 9 and the second surface 11, or may be located so that a height from the first surface 9 is equal to a height from the second surface 11 in a non-limiting embodiment illustrated in FIGS. 3 to 5.

The first bottom surface 25 may be located parallel to or inclined relative to the imaginary plane S. As illustrated in FIG. 3, the first bottom surface 25 may be inclined so as to close to the imaginary plane S as further away from the second lateral surface 15 in a front view of the first lateral surface 13. As illustrated in FIG. 4, the second bottom surface 31 may be inclined so as to close to the imaginary plane S as further away from the first lateral surface 13 in a front view of the second lateral surface 15.

A relatively large cutting load may tend to be applied to the first corner 5a if the first cutting edge 21 in the first part 5 is used for a cutting process. Therefore, a region in the first bottom surface 25 which corresponds to the first corner 5a may tend to be subjected to a large cutting load in a direction from the first part 5 toward the base body 3.

A relatively large cutting load may tend to be applied to the second corner 7a if the second cutting edge 23 in the second part 7 is used for the cutting process. Therefore, a region in the second bottom surface 31 which corresponds to the second corner 7a may tend to be subjected to a large cutting load in a direction from the second part 7 toward the base body 3.

If the first bottom surface 25 and the second bottom surface 31 are inclined as described above, it may be possible to ensure a large thickness of a region in the base body 3 which is surrounded by the first corner 5a and the second corner 7a. The base body 3 may therefore have enhanced durability, and chipping may be less likely to occur.

Alternatively, the second bottom surface 31 may be inclined so as to close to the imaginary plane S as further away from the second lateral surface 15 in the front view of the first lateral surface 13 as illustrated in FIG. 3. The first bottom surface 25 may be inclined so as to close to the imaginary plane S as further away from the first lateral surface 13 in the front view of the second lateral surface 15 as illustrated in FIG. 4.

If the first bottom surface 25 and the second bottom surface 31 are inclined as described above, it may become easier to ensure a larger thickness of the region in the base body 3 which is surrounded by the first corner 5a and the second corner 7a. This may lead to higher durability of the base body 3, and chipping may be much less likely to occur.

An angle at which an imaginary extension line L2 of the first bottom surface 25 intersects with the imaginary plane S may be taken as a first inclination angle $\theta 1$ in the front view of the first lateral surface 13. An angle at which an imaginary extension line L3 of the first bottom surface 25 intersects with the imaginary plane S may be taken as a second inclination angle $\theta 2$ in the front view of the second lateral surface 15. The first angle θ1 may be the same as or different from the second inclination angle θ2.

Figure 11:
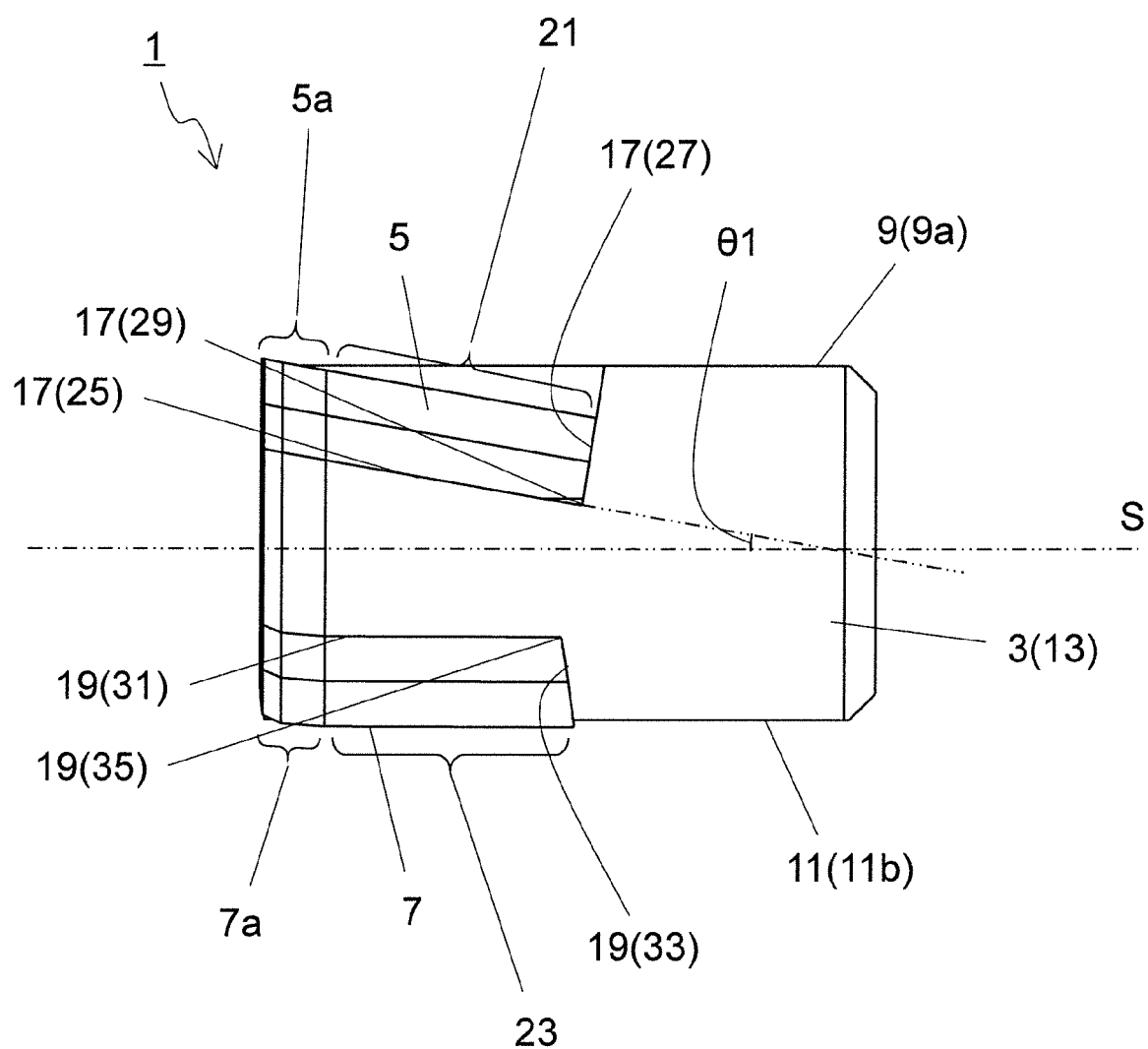
FIG. 11 is a side view of the cutting insert illustrated in FIG. 10 as viewed from an A4 direction.

A height of the second bottom surface 31 from the imaginary plane S may be kept constant in the front view of the first lateral surface 13 as in a non-limiting embodiment illustrated in FIG. 11. A height of the first bottom surface 25 from the imaginary plane S may be kept constant in the front view of the second lateral surface 15 as in a non-limiting embodiment illustrated in FIG. 12.

Figure 12:
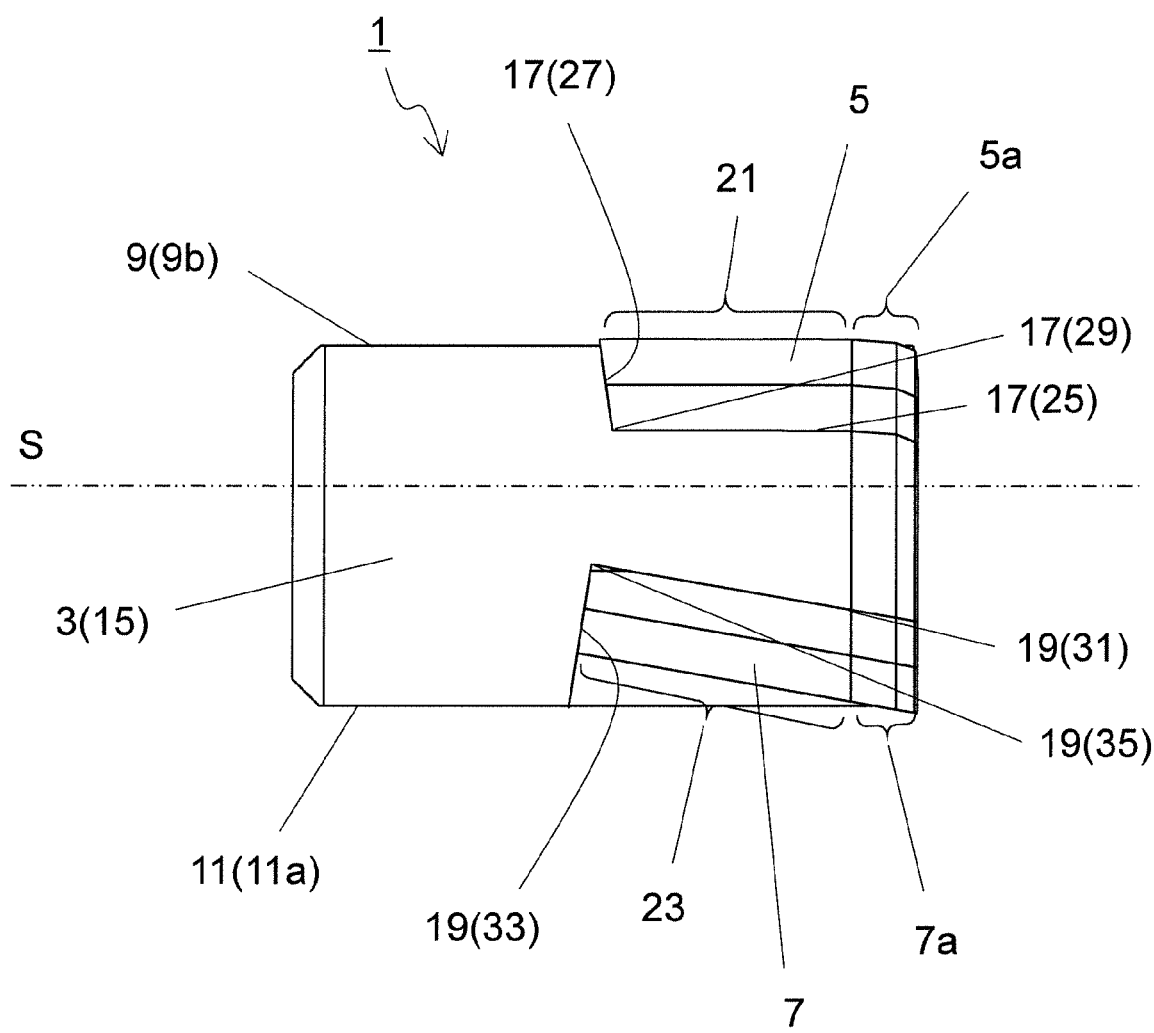
FIG. 12 is a side view of the cutting insert illustrated in FIG. 10 as viewed from an A5 direction.

A non-limiting embodiment illustrated in FIGS. 11 and 12 may be effective, for example, in cases where a part of the first cutting edge 21 which is located along the first side 9a and a part of the second cutting edge 23 which is located along the third side 11a are used as a main cutting edge, and a part of the first cutting edge 21 which is located along the second side 9b and a part of the second cutting edge 23 which is located along the fourth side 11b are used as a flat cutting edge.

If the part of the first cutting edge 21 which is located along the second side 9b is used as the flat cutting edge, a cutting load applied from the part may be relatively small. Therefore, the durability of the base body 3 may be less likely to be affected even if the height of the first bottom surface 25 from the imaginary plane S is kept constant in the front view of the second lateral surface 15. If the height of the first bottom surface 25 from the imaginary plane S is kept constant in the front view of the second lateral surface 15, a surface roughness of a machined surface of a workpiece may tend to become small, thereby improving machining accuracy.

Similarly, if the part of the second cutting edge 23 which is located along the fourth side 11b is used as the flat cutting edge, a cutting load applied from the part may be relatively small. Therefore, the durability of the base body 3 may be less likely to be affected even if the height of the second bottom surface 31 from the imaginary plane S is kept constant in the front view of the first lateral surface 13. If the height of the second bottom surface 31 from the imaginary plane S is kept constant in the front view of the first lateral surface 13, the surface roughness of the machined surface of the workpiece may tend to become small, thereby improving machining accuracy.

The insert 1 may include a through hole 37 as illustrated in FIG. 1. The through hole 37 may be formed from the first surface 9 to the second surface 11 or may open into these surfaces. The through hole 37 may be extended along the central axis X1. The through hole 37 may be usable for attaching a screw or clamp when causing the insert 1 to be held by the holder.

The through hole 37 may open into regions in the lateral surfaces which are located on opposite sides. Alternatively, the insert 1 may not include the through hole 37. For example, the insert 1 does may not include the through hole 37 in a non-limiting embodiment illustrated in FIG. 13.

Figure 13:
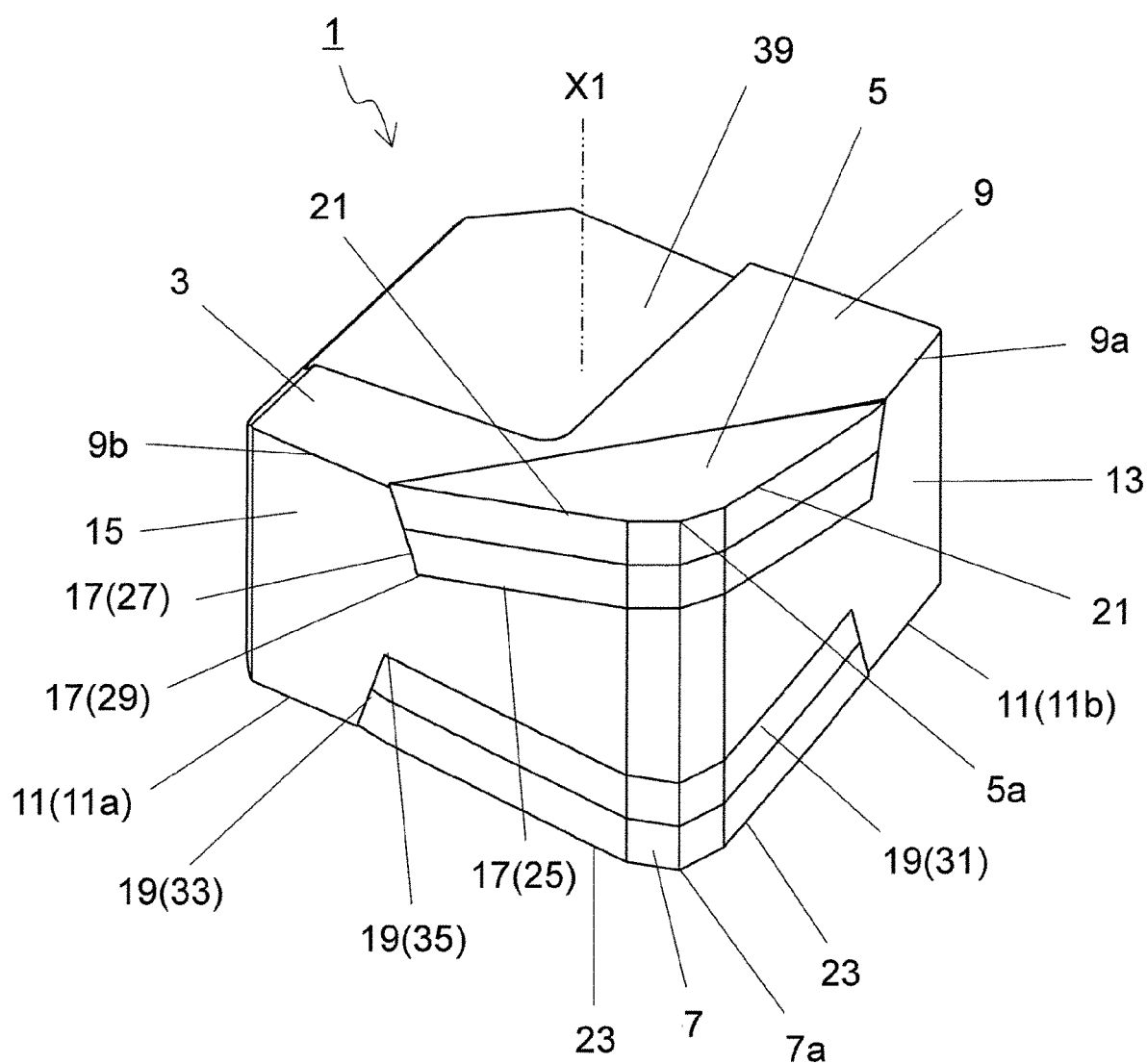
FIG. 13 is a perspective view illustrating a cutting insert in one of the non-limiting embodiments.
Figure 14:
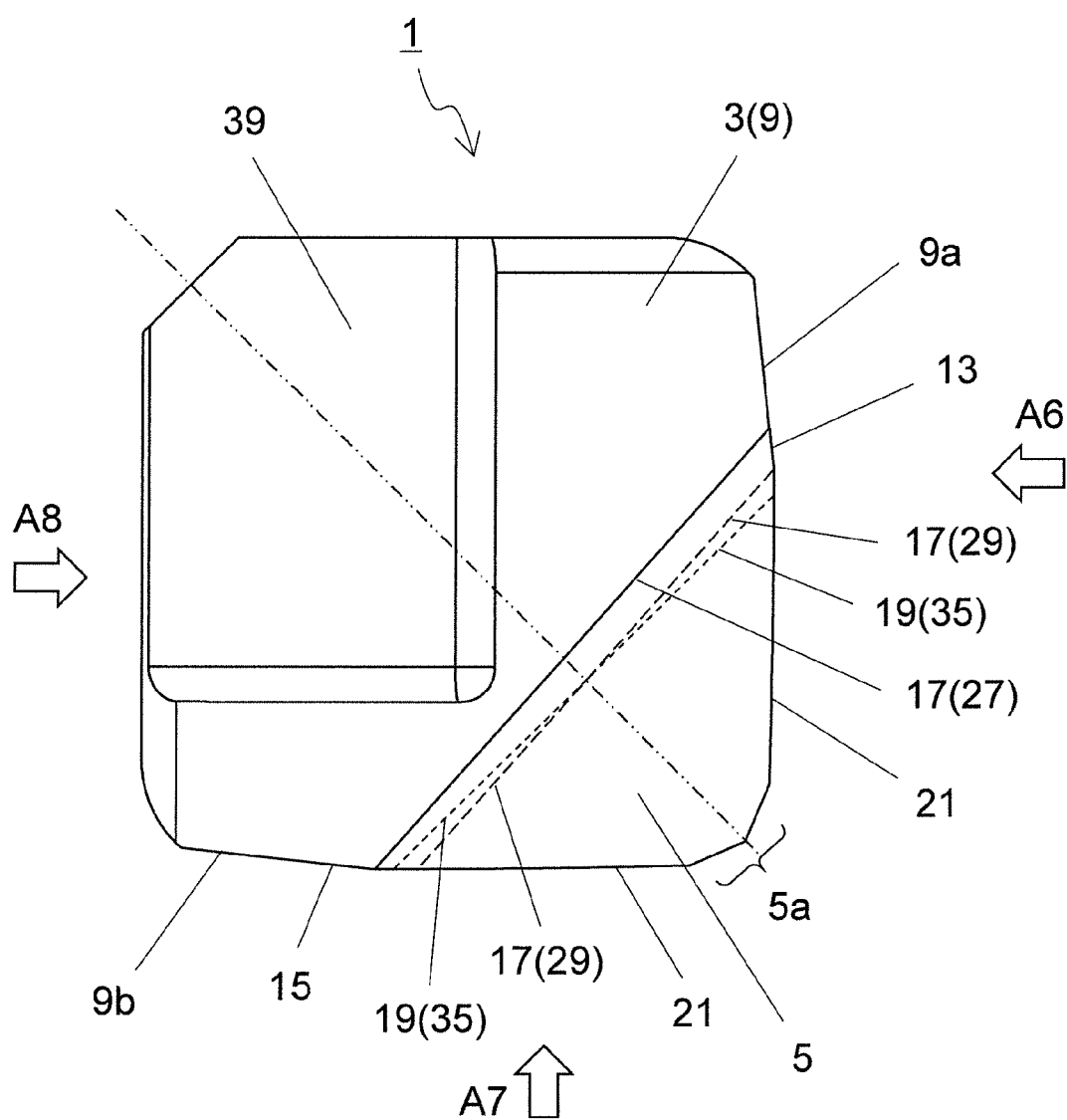
FIG. 14 is a front view of a first surface of the cutting insert illustrated in FIG. 13.
Figure 15:
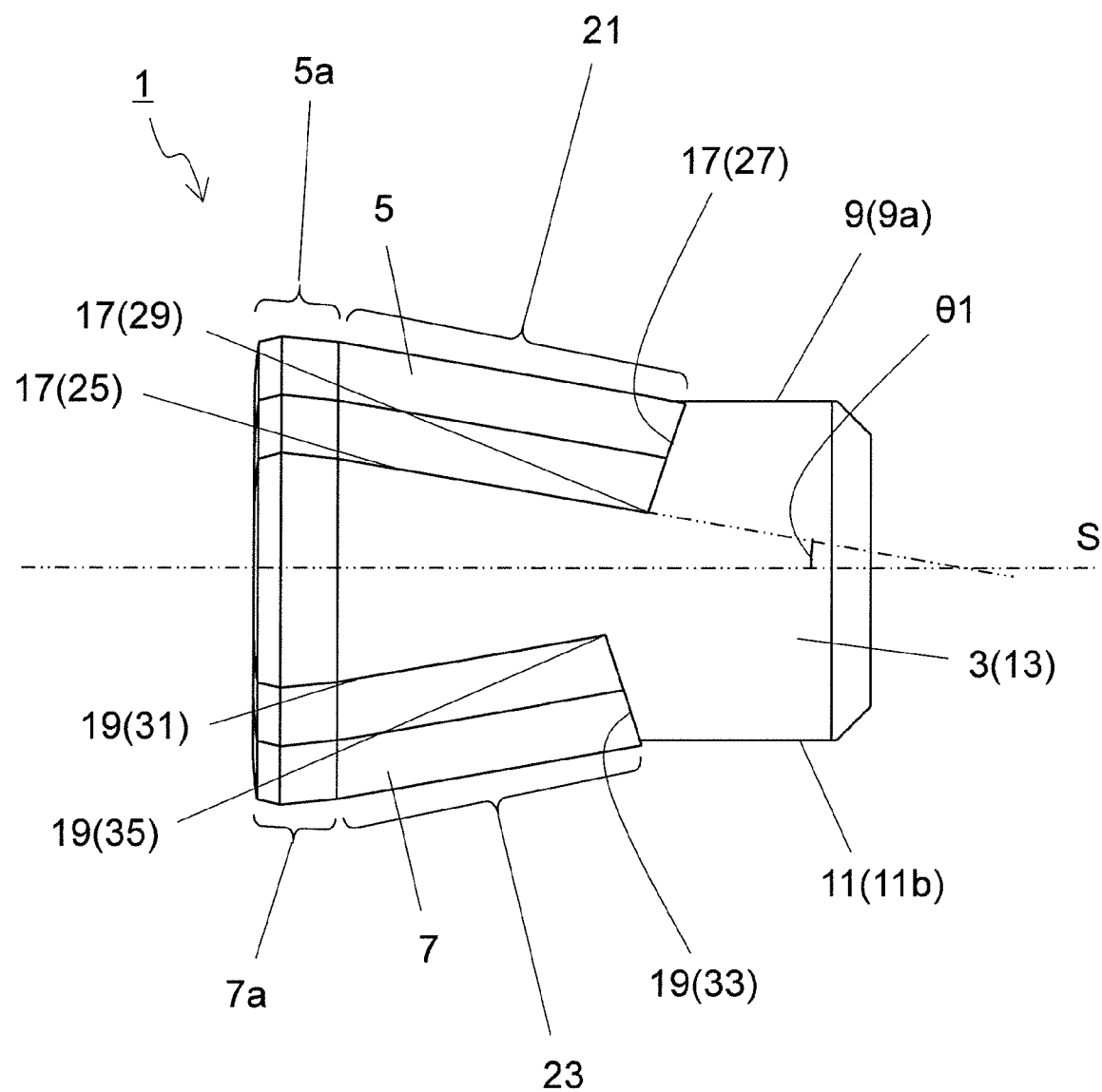
FIG. 15 is a side view of the cutting insert illustrated in FIG. 14 as viewed from an A7 direction.
Figure 16:
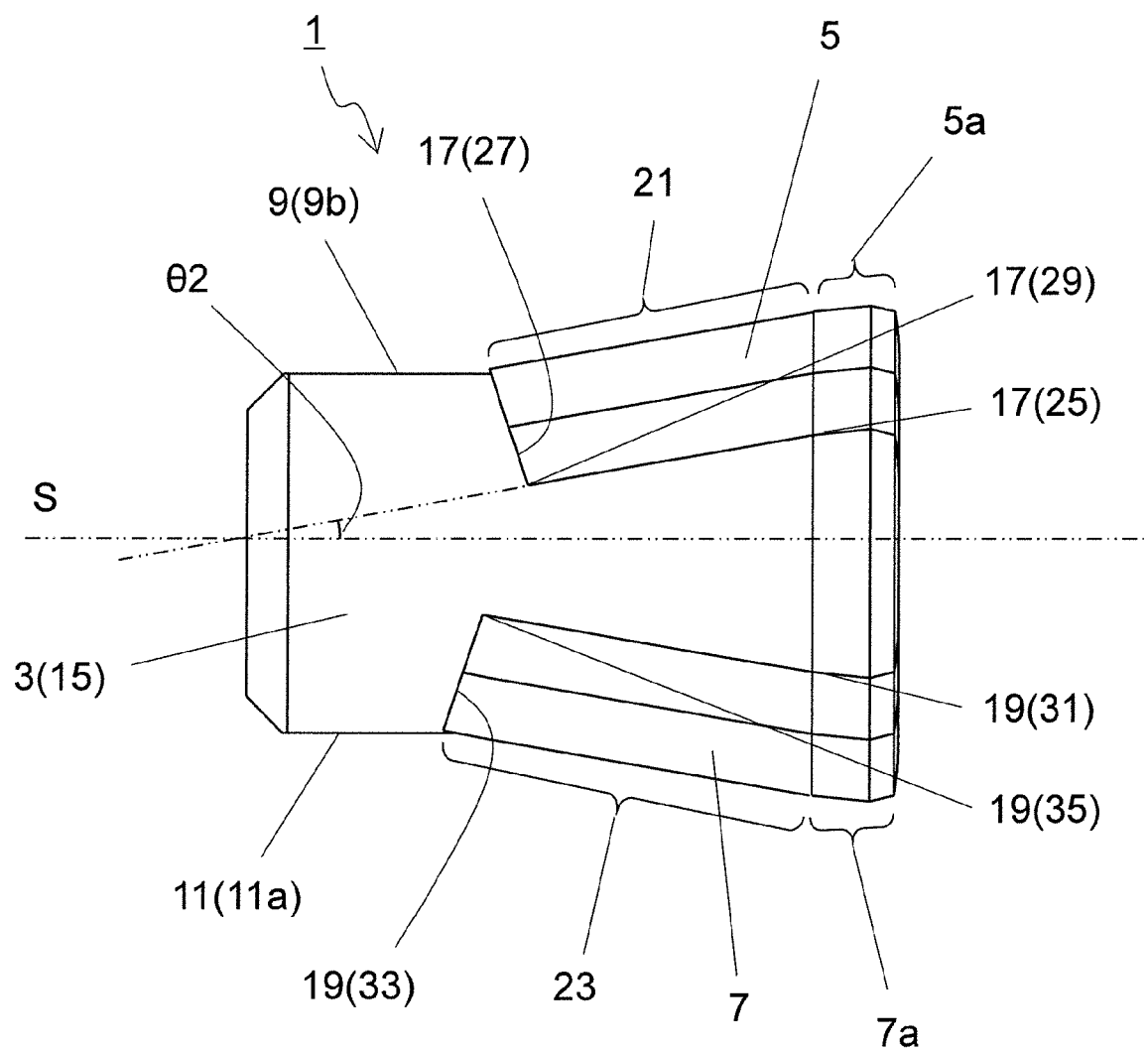
FIG. 16 is a side view of the cutting insert illustrated in FIG. 15 as viewed from an A8 direction.
Figure 17:
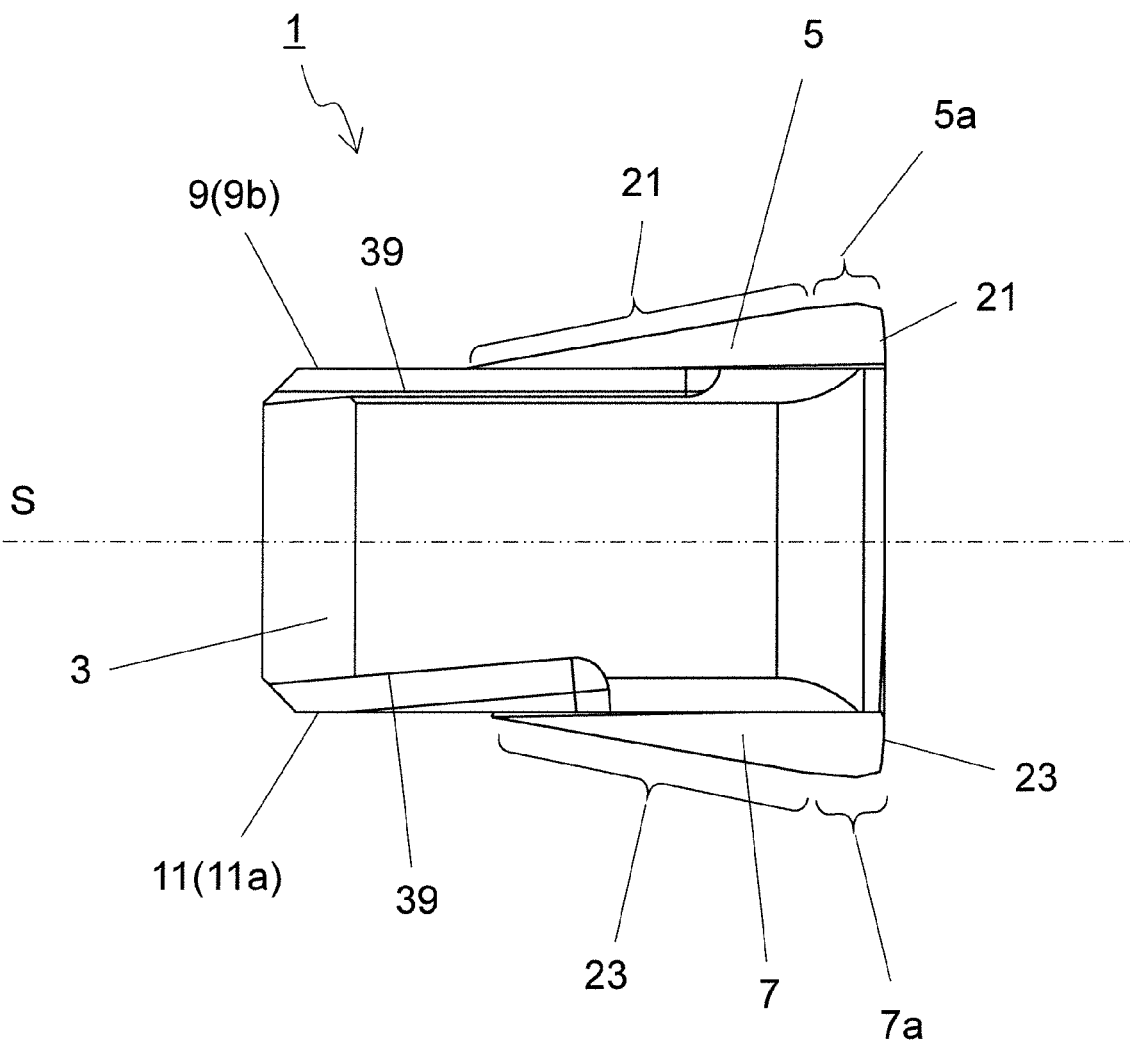
FIG. 17 is a side view of the cutting insert illustrated in FIG. 15 as viewed from an A9 direction.

The insert 1 may include, instead of the through hole 37, third recesses 39 respectively located on the first surface 9 and the second surface 11 as illustrated in FIG. 13. The insert 1 can be held by the holder by attaching the clamp to either the third recess 39 located on the first surface 9 or the third recess 39 located on the second surface 11.

The third recess 39 may connect to the first recess 17 and/or the second recess 19. Alternatively, the third recess 39 may be located away from the first recess 17 and the second recess 19 as illustrated in FIG. 13. If the third recess 39 is located as described above, chips generated by the first cutting edge 21 or the second cutting edge 23 may be less likely to enter the third recess 39. It may therefore be possible to stably hold the insert 1 by the holder.

For example, cemented carbide, cermet and ceramics may be usable as a material of the base body 3. Examples of composition of the cemented carbide may include WC (tungsten carbide)-Co, WC—TiC (titanium carbide)-Co and WC—TiC—TaC (tantalum carbide)-Co.

As used here, WC, TiC and TaC may be hard particles, and Co may be a binding phase. The cermet may be a sintered composite material obtainable by compositing metal into a ceramic component. Examples of the cermet may include compounds composed mainly of TiC or TiN (titanium nitride). The material of the base body 3 is not limited to the above.

Examples of material of the first part 5 and the second part 7 may include cemented carbide, PCD (polycrystal diamond) and cBN (cubic boron nitride). The materials of the first part 5 and the second part 7 are not limited to the above.

The first part 5 and the second part 7 may be joined to the base body 3 by using a joining member, such as a brazing material. Alternatively, the first part 5 and the second part 7 may be joined together by being sintered integrally with the base body 3.

The insert 1 may be formed only by the base body 3, the first part 5 and the second part 7. Alternatively, the insert 1 may include, in addition to the base body 3, the first part 5 and the second part 7, a coating layer for covering surfaces of these parts. The coating layer may cover the whole or part of a surface of the main body formed by the base body 3, the first part 5 and the second part 7.

Examples of material of the coating layer may include aluminum oxide (alumina), and carbides, nitrides, oxides, carbonates, nitrogen oxides, carbonitrides and carboxynitrides of titanium. The coating layer may include only one or a plurality of the above-mentioned materials.

The coating layer may be composed of only one layer or may be a structure in which a plurality of layers are laminated one upon another. The material of the coating layer is not limited to these materials. The coating layer can be located on the base material by using chemical vapor deposition (CVD) method or physical vapor deposition (PVD) method.

<Cutting Tools>

Figure 18:
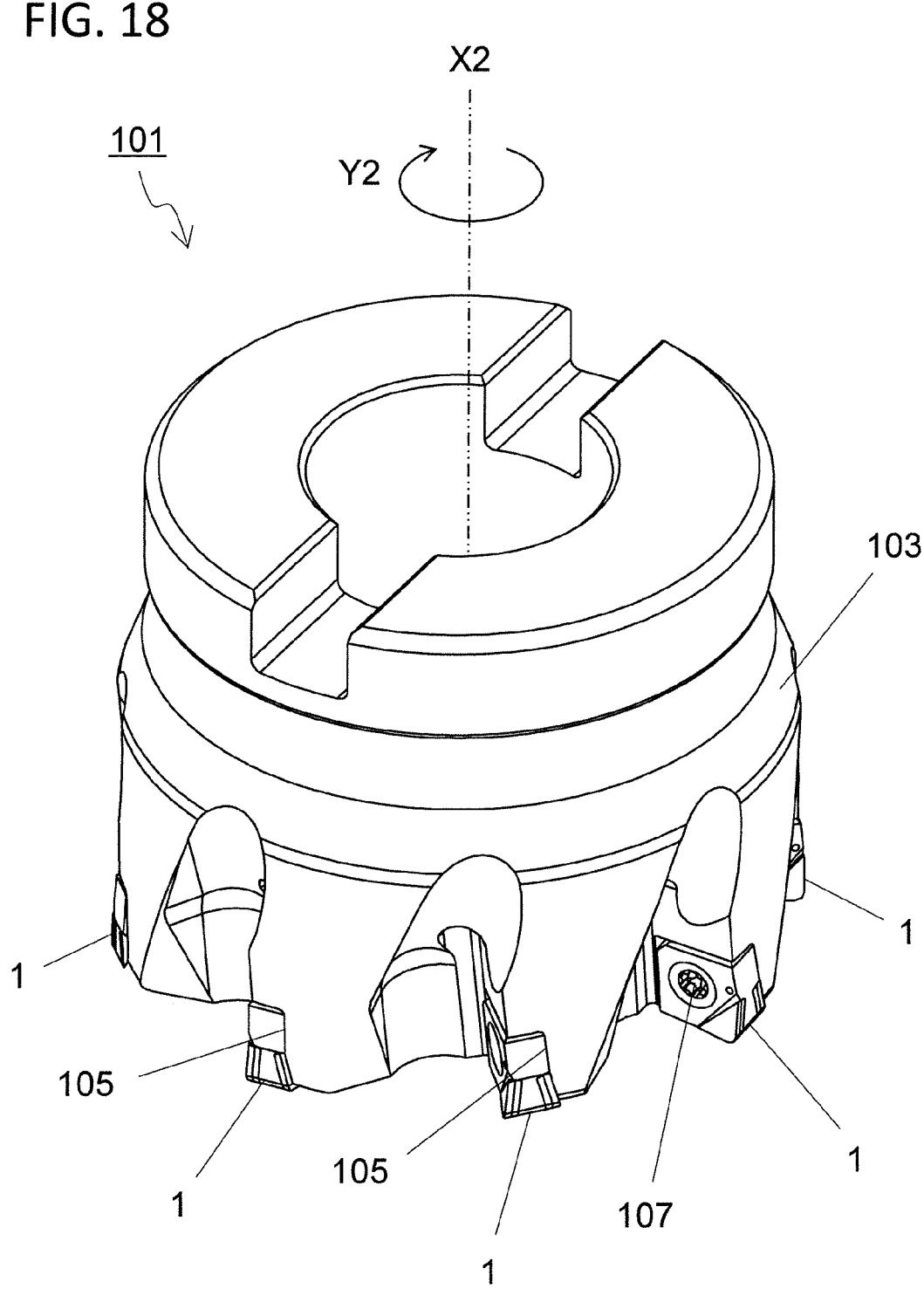
FIG. 18 is a perspective view illustrating a cutting tool in a non-limiting embodiment.
Figure 19:
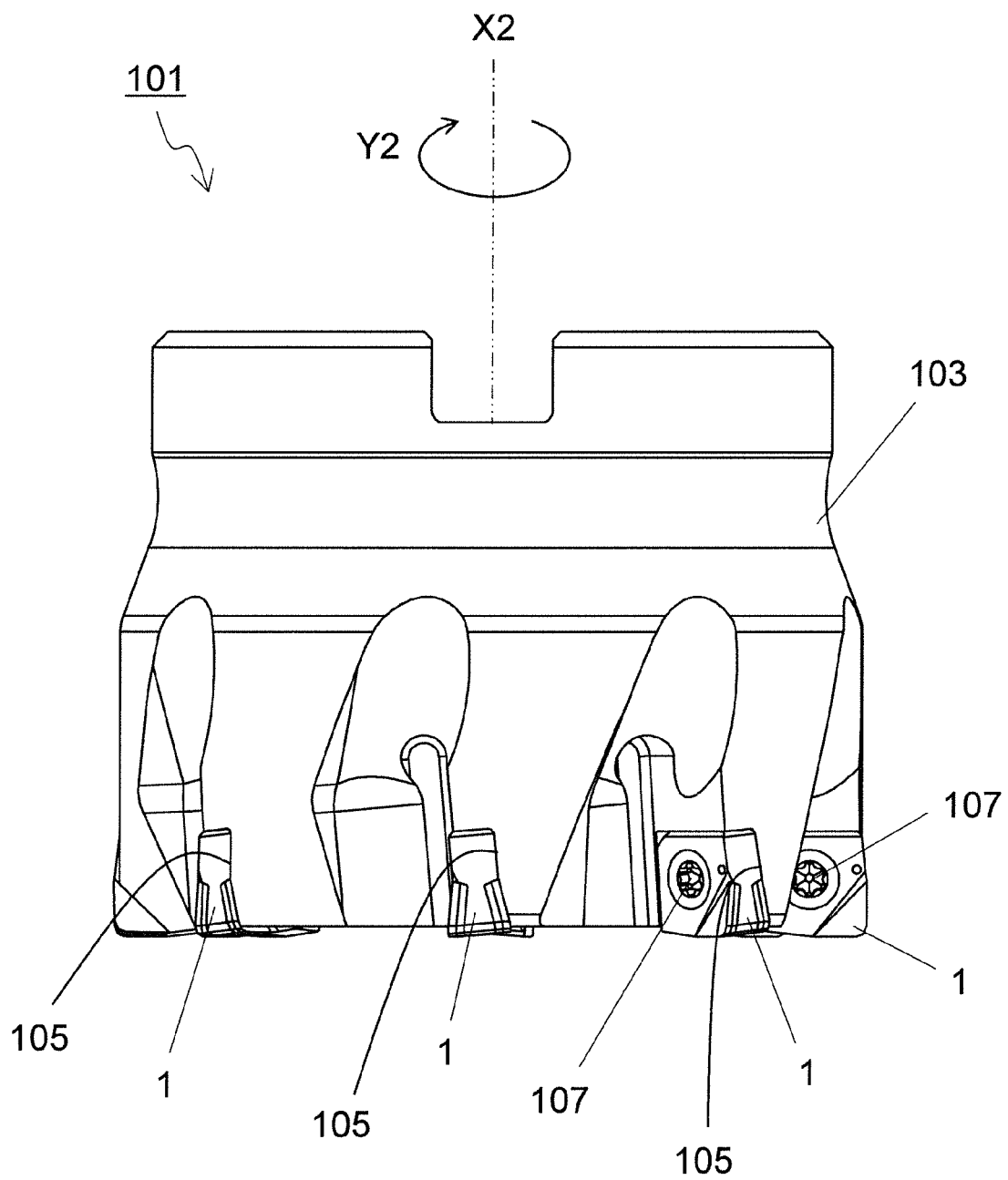
FIG. 19 is a side view of the cutting tool illustrated in FIG. 18.
Figure 20:
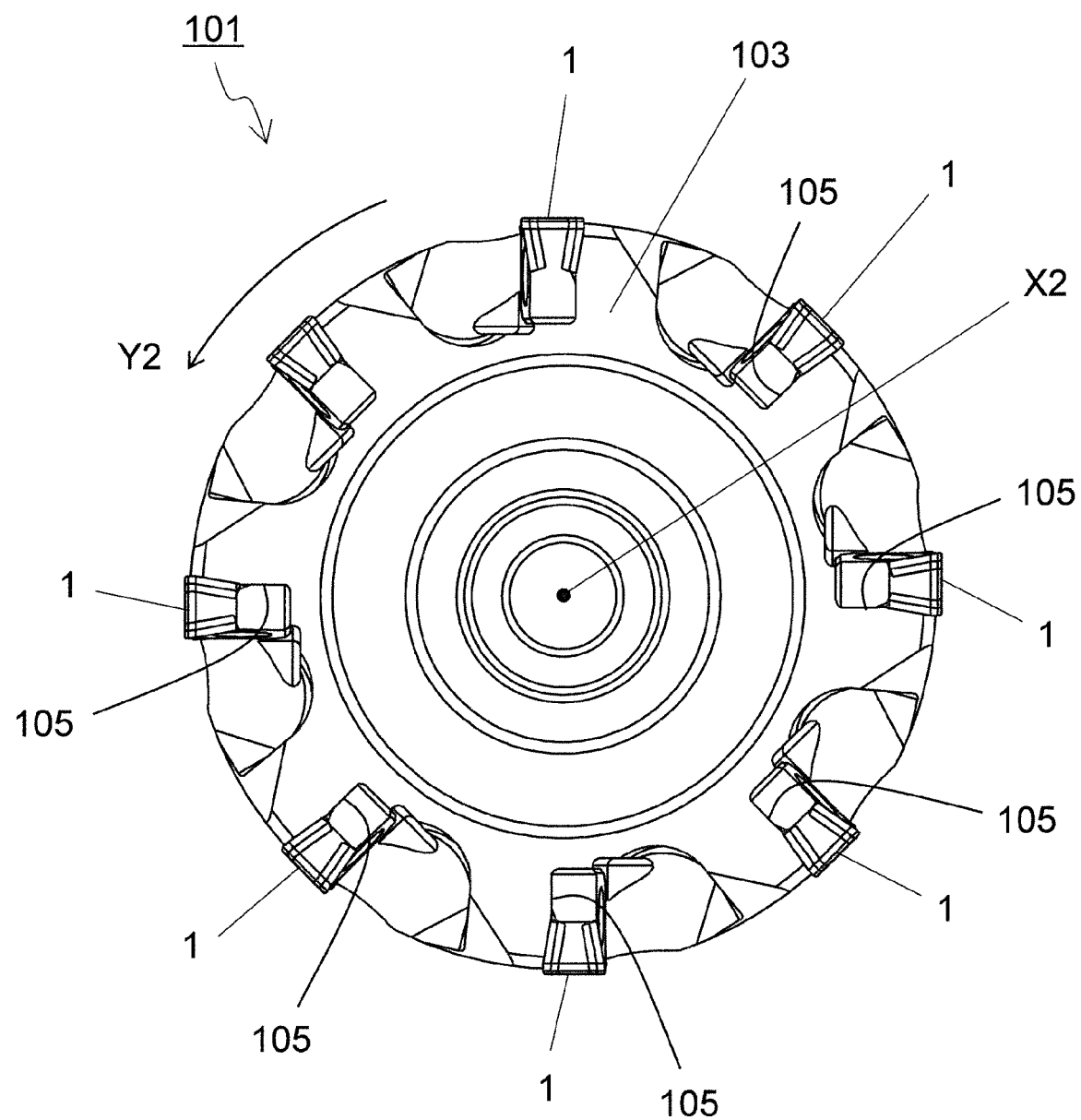
FIG. 20 is a front view of the cutting tool illustrated in FIG. 19 as viewed from an A10 direction.

The cutting tool 101 in non-limiting embodiments may be described below with reference to FIGS. 18 to 20. FIGS. 18 to 20 may illustrate a state where the insert 1 in a non-limiting embodiment illustrated in FIG. 1 is attached to a pocket 105 of a holder 103 by a screw 107. A rotation axis X2 of the cutting tool 101 may be indicated by a two-dot chain line in FIG. 18 or the like.

The cutting tool 101 in a non-limiting embodiment may be usable for a milling process. The cutting tool 101 may include the holder 103, which has the rotation axis X2 and includes a plurality of pockets 105 on an outer peripheral surface on a side of a front end of the holder 103, and the inserts 1 individually attached to the pockets 105.

The holder 103 may have an approximately circular columnar shape around the rotation axis X2. A plurality of pockets 105 may be disposed on the outer peripheral surface on the side of the front end of the holder 103. The pockets 105 may be designed to permit attachment of the inserts 1, and may open into the outer peripheral surface and a front end surface of the holder 103. The plurality of pockets 105 may be disposed at equal intervals or unequal intervals. The holder 103 is not a strict circular columnar shape because the holder 103 may include the plurality of pockets 105.

The inserts 1 may be individually attached to the plurality of pockets 105 disposed in the holder 103. Each of the inserts 1 may be attached so that at least a part of the cutting edge is protruded from the holder 103. Specifically, each of the inserts 1 may be attached to the holder 103 so that the first cutting edge is protruded from the holder toward a workpiece in the non-limiting embodiments.

The inserts 1 may be individually attached to the pockets 105 so that the first surface is directed to a front side in a rotation direction Y2 of the rotation axis X2, and also so that the second surface is directed to a rear side in the rotation direction Y2 of the rotation axis X2 in the non-limiting embodiments.

The inserts 1 may be individually fixed to the pockets 105 by the screw 107. Each of the inserts 1 may be attachable to the holder 103 by inserting the screw 107 into the through hole of the insert 1, and by inserting a front end of the screw 107 into a screw hole formed in the pocket 105 so as to fix the screw 107 to the screw hole. The screw 107 may not be used for fixing the insert 1 to the pocket 105. For example, a clamp or the like may be used instead of the screw 107.

For example, steel, cast iron or the like may be usable for the holder 103. In particularly, the holder 103 may have enhanced toughness if steel is used for the holder 103.

<Method for Manufacturing Machined Product>

Figure 21:
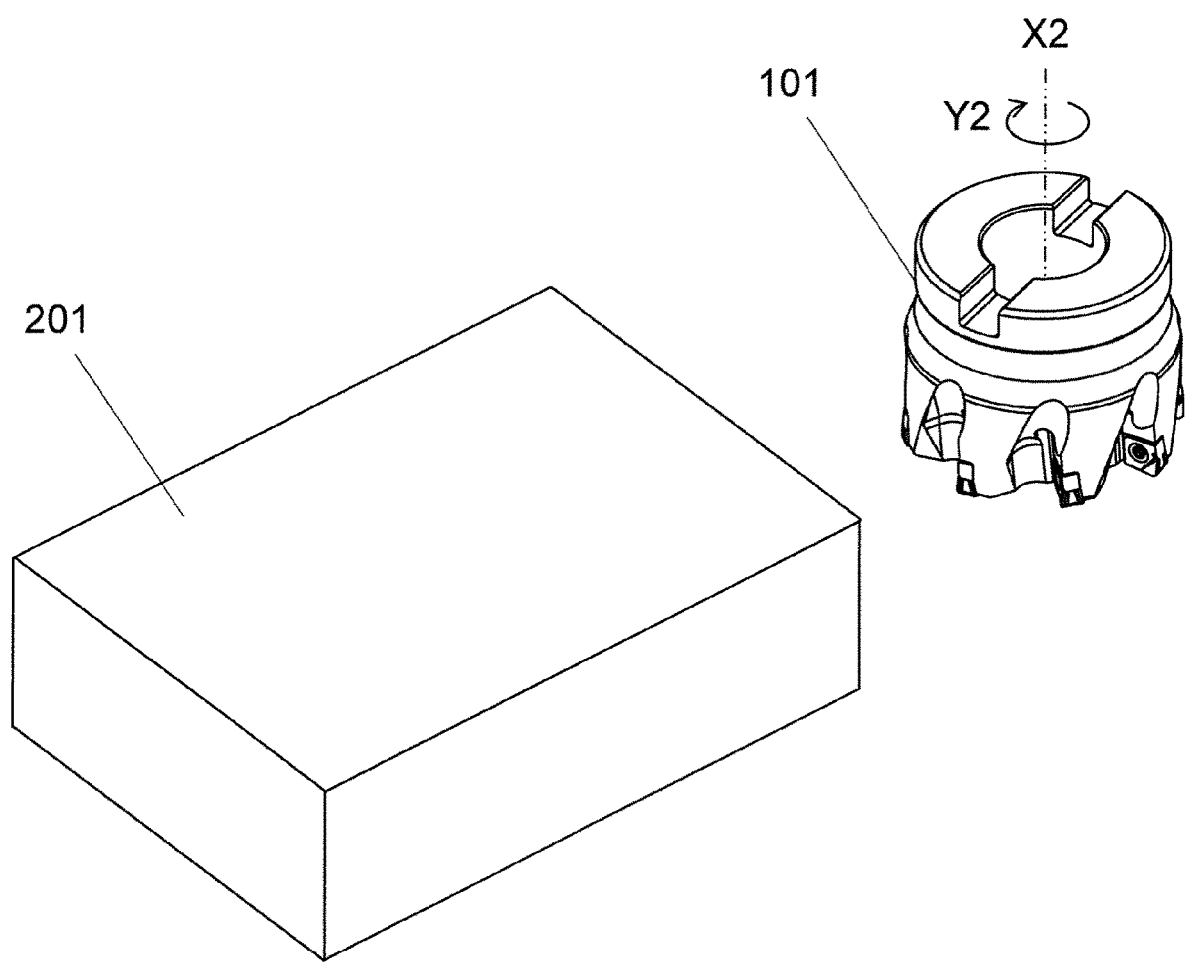
FIG. 21 is a schematic diagram illustrating one of steps in a method for manufacturing a machined product in a non-limiting embodiment.
Figure 22:
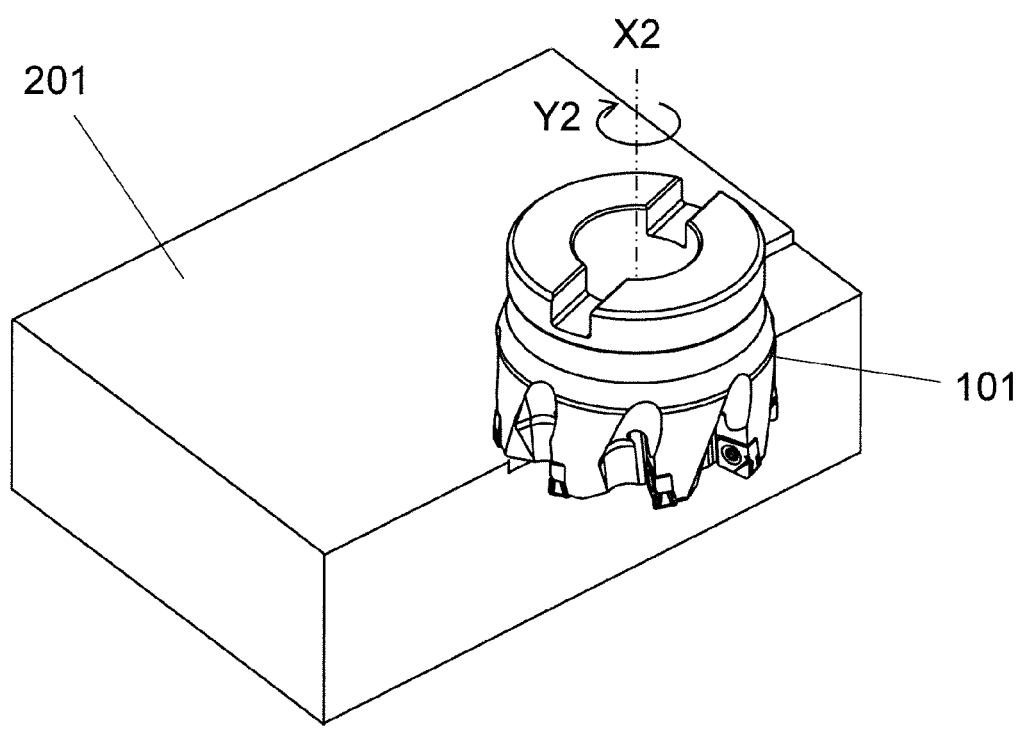
FIG. 22 is a schematic diagram illustrating one of the steps in the method for manufacturing a machined product in the non-limiting embodiment.
Figure 23:
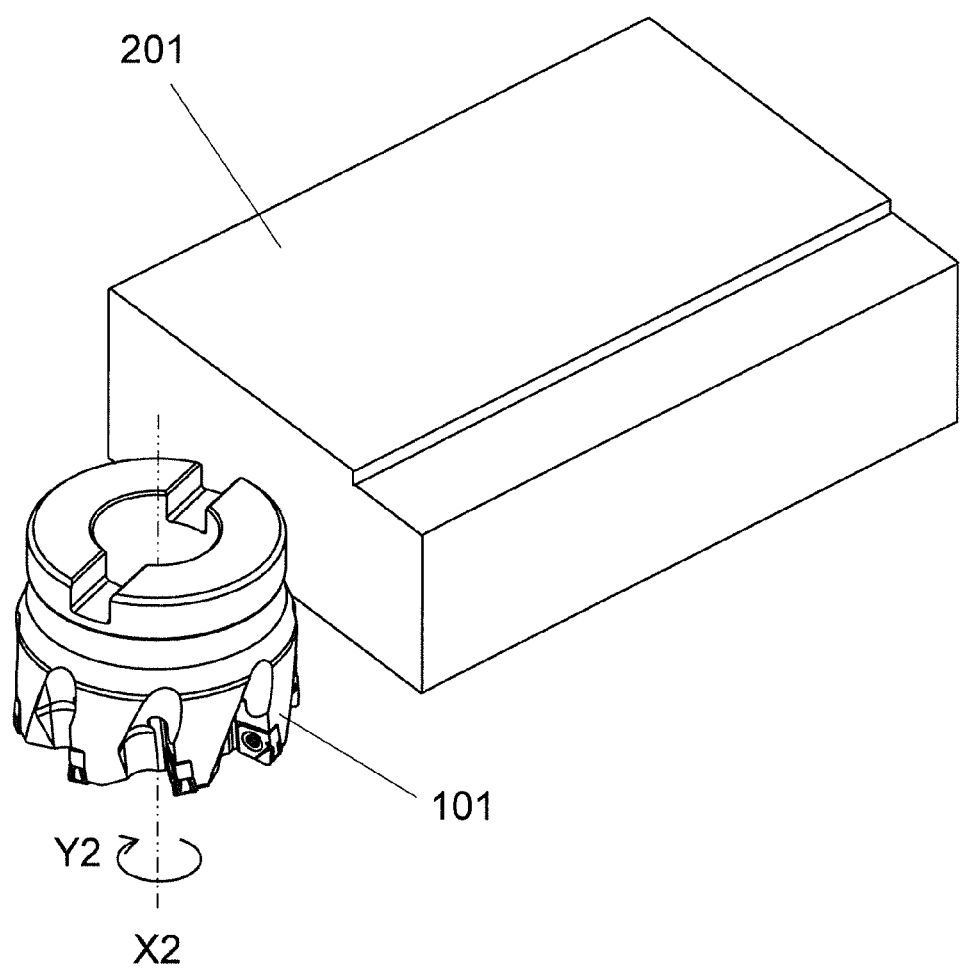
FIG. 23 is a schematic diagram illustrating one of the steps in the method for manufacturing a machined product in the non-limiting embodiment.

A method for manufacturing a machined product in non-limiting embodiments may be described below with reference to FIGS. 21 to 23. FIGS. 21 to 23 may illustrate the method for manufacturing a machined product if a cutting process is carried out using the cutting tool 101 as described above. The rotation axis X2 of the cutting tool 101 may be indicated by a dash-dot-dot-dash line in FIGS. 21 to 23. The machined product may be manufacturable by carrying out the cutting process of a workpiece 201. The manufacturing method in a non-limiting embodiment may include the following steps:

the step (1) of rotating the cutting tool 101 represented by the foregoing non-limiting embodiments;

the step (2) of bringing the cutting edge of the cutting tool 101 being rotated into contact with the workpiece 201; and the step (3) of moving the cutting tool 101 away from the workpiece 201.

More specifically, firstly, the cutting tool 101 may be relatively brought near the workpiece 201 while rotating the cutting tool 101 in a Y2 direction around the rotation axis X2 as illustrated in FIG. 21. The workpiece 201 may be then cut out by bringing the cutting edge in the cutting tool 101 into contact with the workpiece 201 as illustrated in FIG. 22. Thereafter, the cutting tool 101 may be relatively moved away from the workpiece 201 as illustrated in FIG. 23.

The workpiece 201 may be fixed and the cutting tool 101 may be brought near the workpiece 201 in the above non-limiting embodiment. The workpiece 201 may be fixed and the cutting tool 101 may be rotated around the rotation axis X2 in FIGS. 21 to 23. The workpiece 201 may be fixed and the cutting tool 101 may be moved away in FIG. 23. Although the workpiece 201 is fixed and the cutting tool 101 is moved in the individual steps of the cutting process using the manufacturing method in the above non-limiting embodiment, it is not intended to limit to this embodiment.

For example, the workpiece 201 may be brought near the cutting tool 101 in the step (1). Similarly, the workpiece 201 may be moved away from the cutting tool 101 in the step (3). If desired to continue the cutting process, the step of bringing the cutting edge in the insert 1 into contact with different portions of the workpiece 201 may be repeated while keeping the cutting tool 101 rotated.

Representative examples of material of the workpiece 201 may include carbon steel, alloy steel, stainless steel, cast iron and nonferrous metals.

DESCRIPTION OF THE REFERENCE NUMERAL 1 cutting insert (insert)
3 base body
5 first part
5a first corner
7 second part
7a second corner
9 first surface
9a first side
9b second side
11 second surface
11a third side
11b fourth side
13 first lateral surface
15 second lateral surface
17 first recess
19 second recess
21 first cutting edge
23 second cutting edge
25 first bottom surface
27 first wall surface
29 first valley line
31 second bottom surface
33 second wall surface
35 second valley line
37 through hole
39 third recess
101 cutting tool
103 holder
105 pocket
107 screw
201 workpiece

The invention claimed is:

1. A cutting insert, comprising:
a base body comprising
a first surface,
a second surface located on a side opposite to the first surface,
a first lateral surface connecting to the first surface and the second surface,
a second lateral surface connecting to the first surface, the second surface and the first lateral surface,
a first recess opening into the first surface, the first lateral surface and the second lateral surface, and
a second recess opening into the second surface, the first lateral surface and the second lateral surface;
a first part located in the first recess and comprising a first cutting edge located at an intersection of two adjacent surfaces; and
a second part located in the second recess and comprising a second cutting edge located at an intersection of two adjacent surfaces, wherein
the first recess comprises
a first bottom surface located away from the first surface,
a first wall surface located between the first bottom surface and the first surface, and
a first valley line located on an intersection of the first bottom surface and the first wall surface, the second recess comprises
- a second bottom surface located away from the second surface,
- a second wall surface located between the second bottom surface and the second surface, and
- a second valley line located on an intersection of the second bottom surface and the second wall surface, and in a transparent plan view of the first surface, the first valley line is different from the second valley line and the first valley line intersects with the second valley line.

2. The cutting insert according to claim 1, wherein a first width in a direction along the first lateral surface from the first wall surface to a first corner is larger than a second width in a direction along the second lateral surface from the first wall surface to the first corner in a front view of the first surface.

3. The cutting insert according to claim 1, wherein
the first part comprises a first corner having a triangular shape in a front view of the first surface, and
the first valley line intersects with the second valley line on a bisector of the first corner in the transparent plan view of the first surface.

4. The cutting insert according to claim 1, wherein
a line passing through a center of the first surface and a center of the second surface is a central axis,
a plane that is located between the first recess and the second recess and orthogonal to the central axis is an imaginary plane,
the first bottom surface is closer to the imaginary plane as further away from the second lateral surface in a front view of the first lateral surface, and
the second bottom surface is closer to the imaginary plane as further away from the first lateral surface in a front view of the second lateral surface.

5. The cutting insert according to claim 4, wherein
the second bottom surface is closer to the imaginary plane as further away from the second lateral surface in the front view of the first lateral surface, and
the first bottom surface is closer to the imaginary plane as further away from the first lateral surface in the front view of the second lateral surface.

6. The cutting insert according to claim 5, wherein
an angle at which an imaginary extension line of the first bottom surface intersects with the imaginary plane is a first inclination angle in the front view of the first lateral surface,
an angle at which the imaginary extension line of the first bottom surface intersects with the imaginary plane is a second inclination angle in the front view of the second lateral surface, and
the first inclination angle is equal to the second inclination angle.

7. The cutting insert according to claim 4, wherein
a height of the second bottom surface from the imaginary plane is kept constant in the front view of the first lateral surface, and
a height of the first bottom surface from the imaginary plane is kept constant in the front view of the second lateral surface.

8. A cutting tool, comprising:
a holder having a bar shape extended from a first end toward a second end and comprising a pocket located on a side of the first end; and
the cutting insert according to claim 1, the cutting insert being located in the pocket.

9. A method for manufacturing a machined product, comprising:
rotating a workpiece;
bringing the cutting tool according to claim 8 into contact with the workpiece being rotated; and
moving the cutting tool away from the workpiece.

* * * * *